(12) United States Patent
Wetherell et al.

(10) Patent No.: US 12,483,525 B2
(45) Date of Patent: *Nov. 25, 2025

(54) SYSTEMS AND METHODS FOR ELECTRONIC DISTRIBUTION OF MESSAGES OVER COMMUNICATION CHANNELS

(71) Applicant: Verizon Patent and Licensing Inc., Basking Ridge, NJ (US)

(72) Inventors: William G. Wetherell, San Francisco, CA (US); David G. Louie, Mountain View, CA (US); Jeffry B. Sabat, Fairfax, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/581,265

(22) Filed: Jan. 21, 2022

(65) Prior Publication Data

US 2022/0150672 A1 May 12, 2022

Related U.S. Application Data

(63) Continuation of application No. 16/152,016, filed on Oct. 4, 2018, now Pat. No. 11,265,276, which is a (Continued)

(51) Int. Cl.
*H04W 4/14* (2009.01)
*H04L 51/214* (2022.01)
(Continued)

(52) U.S. Cl.
CPC ............ *H04L 51/214* (2022.05); *H04L 51/52* (2022.05); *H04L 51/56* (2022.05); *H04W 4/14* (2013.01);
(Continued)

(58) Field of Classification Search
CPC ....... H04L 51/214; H04L 51/56; H04L 51/52; H04L 51/58; H04L 51/48; H04W 4/14;
(Continued)

(56) References Cited

U.S. PATENT DOCUMENTS 5,923,848 A 7/1999 Goodhand et al.
7,996,473 B2 8/2011 Braam
(Continued)

FOREIGN PATENT DOCUMENTS

WO WO 2007/149526 A2 12/2007

*Primary Examiner* — Muhammad Raza

(57) ABSTRACT

Systems and methods are provided for electronically distributing messages over communication channels. In accordance with one implementation, a system is provided that comprises at least one database for storing instructions for operating an input field and transmitting messages over a plurality of different communication channels, and at least one processing system configured to execute the instructions, to perform a method. The method may include displaying to a user, over a network, an input field for entering messages and receiving from the user, over the network and by entry into the input field, a message, an identification of one or more recipients, and a selection of at least one communication channel. The method may also include determining whether an identifier is stored in relation to each recipient for the selected communication channel and electronically sending, to each recipient with a stored identifier, the message via the selected communication channel.

20 Claims, 27 Drawing Sheets

Related U.S. Application Data continuation of application No. 13/010,265, filed on Jan. 20, 2011, now Pat. No. 10,122,662.

(60) Provisional application No. 61/360,478, filed on Jun. 30, 2010, provisional application No. 61/296,844, filed on Jan. 20, 2010.

(51) Int. Cl.
| | |
|---|---|
| *H04L 51/52* | (2022.01) |
| *H04L 51/56* | (2022.01) |
| *H04W 24/10* | (2009.01) |
| *H04W 72/04* | (2023.01) |
| *H04W 72/06* | (2009.01) |
| *H04W 72/51* | (2023.01) |
| *H04W 72/563* | (2023.01) |
| *H04L 51/48* | (2022.01) |
| *H04L 51/58* | (2022.01) |
| *H04W 4/21* | (2018.01) |

(52) U.S. Cl.
CPC ........... *H04W 24/10* (2013.01); *H04W 72/51* (2023.01); *H04W 72/563* (2023.01); *H04L 51/48* (2022.05); *H04L 51/58* (2022.05); *H04W 4/21* (2018.02)

(58) Field of Classification Search
CPC ... H04W 24/10; H04W 72/048; H04W 72/06; H04W 4/21
See application file for complete search history.

(56) References Cited

U.S. PATENT DOCUMENTS

| | | | |
|---|---|---|---|
| 8,315,623 B1 * | 11/2012 | Flynn | H04W 24/04 |
| | | | 455/406 |
| 8,401,009 B1 | 3/2013 | Dorsey et al. | |
| 2002/0194341 A1 | 12/2002 | Gupta | |
| 2003/0065723 A1 | 4/2003 | Kumhyr et al. | |
| 2005/0210112 A1 * | 9/2005 | Clement | G06Q 10/107 |
| | | | 709/227 |
| 2005/0251555 A1 | 11/2005 | Little | |
| 2006/0128404 A1 * | 6/2006 | Klassen | H04M 1/72436 |
| | | | 455/466 |
| 2007/0115991 A1 | 5/2007 | Ramani et al. | |
| 2008/0001717 A1 | 1/2008 | Fiatal | |
| 2008/0063154 A1 | 3/2008 | Tamari et al. | |
| 2008/0147812 A1 * | 6/2008 | Curtis | G06Q 10/10 |
| | | | 709/206 |
| 2008/0148154 A1 | 6/2008 | Burrell et al. | |
| 2008/0182566 A1 | 7/2008 | Camp, Jr. | |
| 2008/0208984 A1 * | 8/2008 | Rosenberg | H04L 51/04 |
| | | | 709/206 |
| 2008/0268884 A1 | 10/2008 | Lee | |
| 2008/0269919 A1 | 10/2008 | Nissen et al. | |
| 2009/0037413 A1 * | 2/2009 | Castell | G06Q 30/02 |
| 2009/0037536 A1 | 2/2009 | Braam | |
| 2009/0077124 A1 | 3/2009 | Spivack | |
| 2009/0181641 A1 | 7/2009 | Fiatal | |
| 2009/0222333 A1 * | 9/2009 | Rivas | G06Q 10/10 |
| | | | 707/999.107 |
| 2009/0234876 A1 | 9/2009 | Schigel et al. | |
| 2010/0004980 A1 | 1/2010 | Bowen | |
| 2010/0124905 A1 | 5/2010 | Pratt | |
| 2010/0246789 A1 | 9/2010 | Vance | |
| 2010/0268584 A1 | 10/2010 | Pullur | |
| 2015/0106727 A1 * | 4/2015 | Boulter | H04H 60/88 |
| | | | 715/739 |

* cited by examiner

Fig. 6

SYSTEMS AND METHODS FOR ELECTRONIC DISTRIBUTION OF MESSAGES OVER COMMUNICATION CHANNELS

RELATED APPLICATIONS

This patent application is a continuation of and claims the benefit of priority to U.S. Nonprovisional application Ser. No. 16/152,016, filed on Oct. 4, 2018, which is a continuation of and claims the benefit of priority to U.S. Nonprovisional application Ser. No. 13/010,265, filed on Jan. 20, 2011, now U.S. Pat. No. 10,122,662, issued Nov. 6, 2018, which claims the benefit of U.S. Provisional Patent Application No. 61/360,478, filed on Jun. 30, 2010, and U.S. Provisional Patent Application No. 61/296,844, filed on Jan. 20, 2010. The disclosures of the above-referenced applications are expressly incorporated herein by reference to their entireties.

TECHNICAL FIELD

The present disclosure relates generally to systems and methods for managing electronic communications. More particularly, and without limitation, the present disclosure relates to systems and methods for electronically distributing messages over one or more communication channels. The present disclosure also relates to electronically providing an interface, such as a universal input field, for managing and distributing messages over one or more communication channels.

BACKGROUND

As more people turn to electronic communications for their social and professional interaction with others, people are finding their electronic communications interfaces becoming cluttered and unmanageable. For instance, people now often use their e-mail accounts to send text-based messages, photographs, videos, songs, links to web pages, newsletters, invitations to events, etc. As a result, most people have e-mail inboxes that are filled with a wide variety of communications, which they receive at various times in the day, whether they are at or away from their computers. With the growth of mobile devices and online applications, people are also sending more short messaging service (SMS) messages or "text messages" and instant messages (IMs), as well as messages specific to various social networking portals.

The various proliferating forms of communication have made it difficult to select between these communication forms or channels in an intuitive and efficient manner. For example, when deciding to send an electronic communication to another person, a user must decide whether to send an e-mail, an instant message (IM), a text message (SMS), a social portal message (e.g., Facebook message), or a status update, among other communication forms. The interfaces or systems for sending such communications may exist in different places (e.g., email in a webmail browser, IM in a standalone software program, SMS in a mobile device, etc.), any of which may or may not be open or available at the user's convenience. For example, a person may wish to send an SMS even though he or she does not have a mobile device handy. Alternatively, a person might have a computer and mobile device at their disposal but be unsure of which form of communication their intended recipient may prefer to receive. Moreover, some people may consciously prefer certain communication channels over others, or they may be unaware that they tend to use certain communication channels over others, based on who they are communicating with, the time of day, day of week, location, and so on.

In view of the foregoing, there is a need for improved communications systems and methods that can overcome one or more of the problems set forth above. Moreover, there is a need for improved systems and methods for electronically distributing messages over communication channels, as well as an improved interface for managing such messages.

SUMMARY

In accordance with the present disclosure, systems and methods are provided for electronically distributing messages over one or more communication channels. Embodiments consistent with the present disclosure also encompass systems and methods for electronically providing an interface, such as a universal input field, for managing and distributing messages over one or more communication channels.

In accordance with one disclosed exemplary embodiment, a computer-implemented method for electronically distributing messages is provided. The method may include displaying to a user, over a network, an input field for entering messages; receiving from the user, over the network and by entry into the input field, a message, an identification of one or more recipients, and a selection of a communication channel; determining whether an identifier is stored in relation to each recipient for the selected communication channel; and electronically sending, to each recipient with a stored identifier, the message via the selected communication channel.

In accordance with another disclosed exemplary embodiment, a system for electronically distributing messages over communication channels is disclosed. The system includes at least one database for storing instructions for operating an input field and transmitting messages over a plurality of different communication channels; and at least one processing system. The processing system is configured to execute the instructions and perform a method including: displaying to a user, over a network, an input field for entering messages; receiving from the user, over the network and by entry into the input field, a message, an identification of one or more recipients, and a selection of a communication channel; determining whether an identifier is stored in relation to each recipient for the selected communication channel; and electronically sending, for each recipient with a stored identifier, the message via the selected communication channel.

In accordance with another disclosed exemplary embodiment, a computer-implemented method for electronically distributing messages is disclosed. The method includes: displaying to a user, over a network, an input field for entering messages; receiving from the user, over the network and by entry into the input field, a message, an identification of one or more recipients, and a request for auto-selection of a communication channel; determining whether an address, phone number, or unique ID is stored in relation to each recipient for each of a plurality of available communication channels; ranking the available communication channels for which an address, phone number, or unique ID is stored in relation to each recipient, according to one or more criteria; and sending the message to at least one recipient based on the ranking.

Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the invention. In the drawings:

FIGS. 5-11 depict screenshots of exemplary embodiments of a universal input field, and flow diagrams for exemplary methods of displaying and manipulating a universal input field for receiving messages and transmitting those messages over varied communications channels, consistent with embodiments of the present disclosure.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Figure 1A:
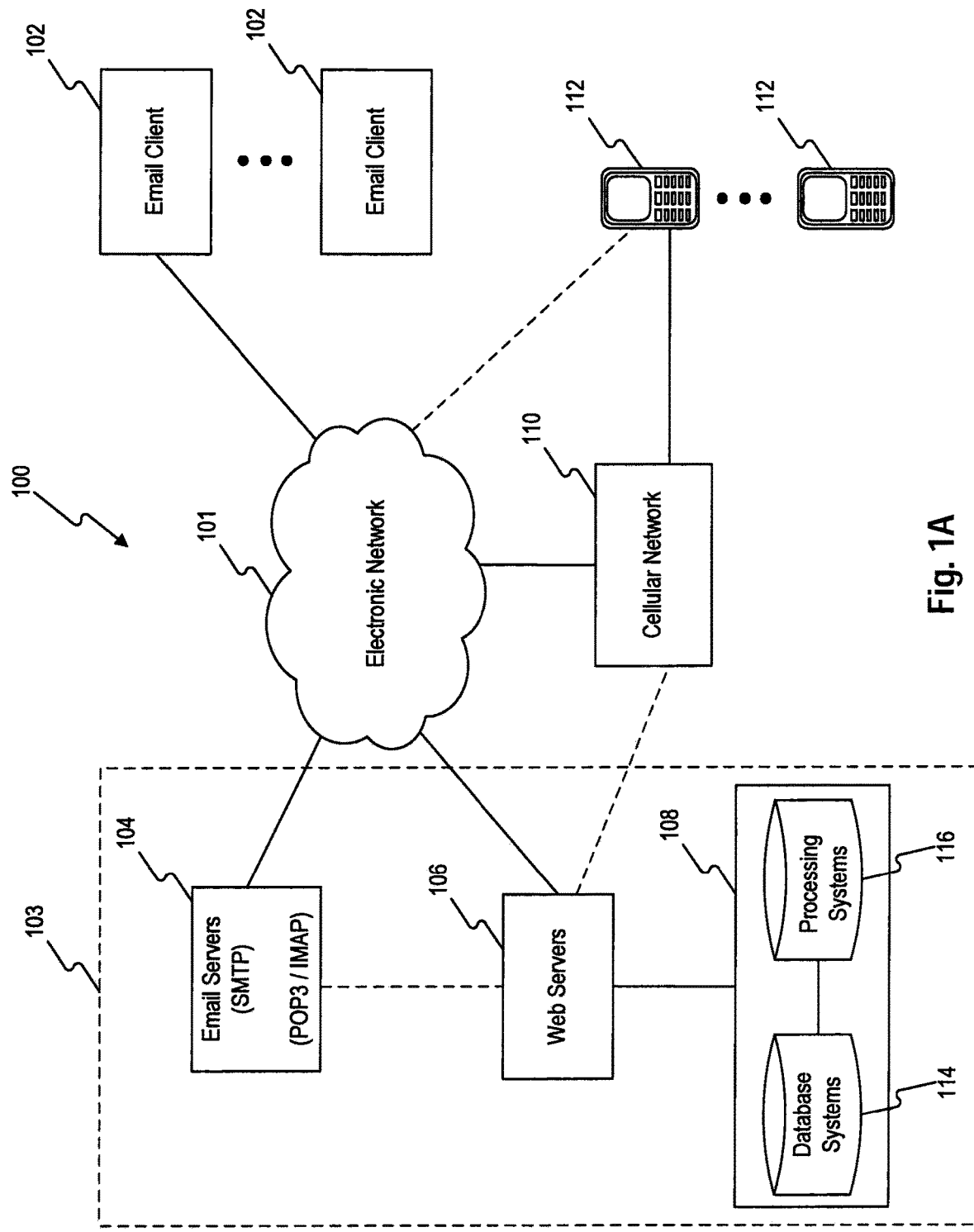
FIG. 1A is a block diagram of an exemplary communications environment 100, consistent with embodiments of the present disclosure.

FIG. 1A is a block diagram of an exemplary communications environment 100 in which embodiments of the present disclosure may be implemented. Communications environment 100 may include a multi-channel messaging system 103 provided in communication with an electronic network 101 and/or a cellular network 110, for distributing messages over a plurality of different communication channels. In one embodiment, messages may initially be received from users by displaying a universal input field on a website, online portal, webmail interface, or mobile device. Electronic communications may include, for example, electronic mail messages (i.e., "e-mails"), Short Messaging System (SMS) messages (i.e., "text messages"), Multimedia Messaging System (MMS) messages, etc., standardized calendar files, invitations, etc. Electronic communications or messages may also include electronic media content such as, for example, photographs, videos, songs, newsletters, articles, web pages, streaming media, or any other electronic multimedia.

Multi-channel messaging system 103 and cellular network 110 may, together or separately, be configured to transmit and receive electronic communications or messages between users of email clients 102 and/or mobile devices 112. In one embodiment, email clients 102 may operate on computers or other web-enabled devices connected to electronic network 101, while mobiles devices 112 may operate primarily relative to a cellular network 110. Electronic network 101 may be any type of wide- or local-area network, such as the Internet. Cellular network 110 may be any type of radio network for broadcasting data, including but not limited to Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN).

Of course, as communications technologies have advanced, the traditional barriers between computers and mobile devices have broken down. For example, individuals may use e-mail or IM software on mobile devices, such as smartphones, tablets, or personal digital assistants (PDAs). Alternatively, individuals may send SMS messages and place voice calls over computers, televisions, or any other Internet-enabled device (e.g., using Voice Over Internet Protocol "VOIP"). Any such mobile or non-mobile devices may transmit electronic messages over wired and/or wireless communication systems, including one or more of cellular networks, local- or wide-area networks, and the Internet. Thus, it will be appreciated that the presently-disclosed systems and methods are applicable to literally any type of device or software that people use to send and receive communications, whether over the Internet or cellular networks, and whether considered mobile, or not.

As shown in FIG. 1A, multi-channel messaging system 103 may include a plurality of email servers 104, and a plurality of web servers 106 all disposed in communication with electronic network 101 and/or cellular network 110. In one exemplary embodiment, users of email clients 102 and/or mobile devices 112 may interact with web pages or webmail portals running on web servers 106. Web servers 106 may interact with email servers 104, either directly or through the Internet 110, in order to send and receive emails and other communications to and from other users in the communications environment 100. Email clients 102 and/or mobile devices 112 may each interact with email servers 104 and/or web servers 106 through computers connected to the electronic network 101 (such as the Internet), or through mobile communications devices, such as mobile phones and PDAs.

In one embodiment, multi-channel messaging system 103 may include a back-end system 108, including one or more database systems 114 and processing systems 116. In general, email servers 104, web servers 106, and back-end system 108 may be configured to facilitate the exemplary disclosed universal input field for receiving messages from users and distributing electronic messages over one or more selected communication channels. As described above, communication channels may include e-mail messaging, SMS text messaging, instant messaging (also called, "chat"), social network messaging, social network updating, voice calling, voice mails, or any other mechanism for transmitting an electronic message between people over an electronic network. In one embodiment, a channel may actually include a plurality of channels. For example, a user may elect to send the same electronic message over two or more of: e-mail messaging, SMS text messaging, instant messaging, social network messaging, social network updating, etc.

Figure 1B:
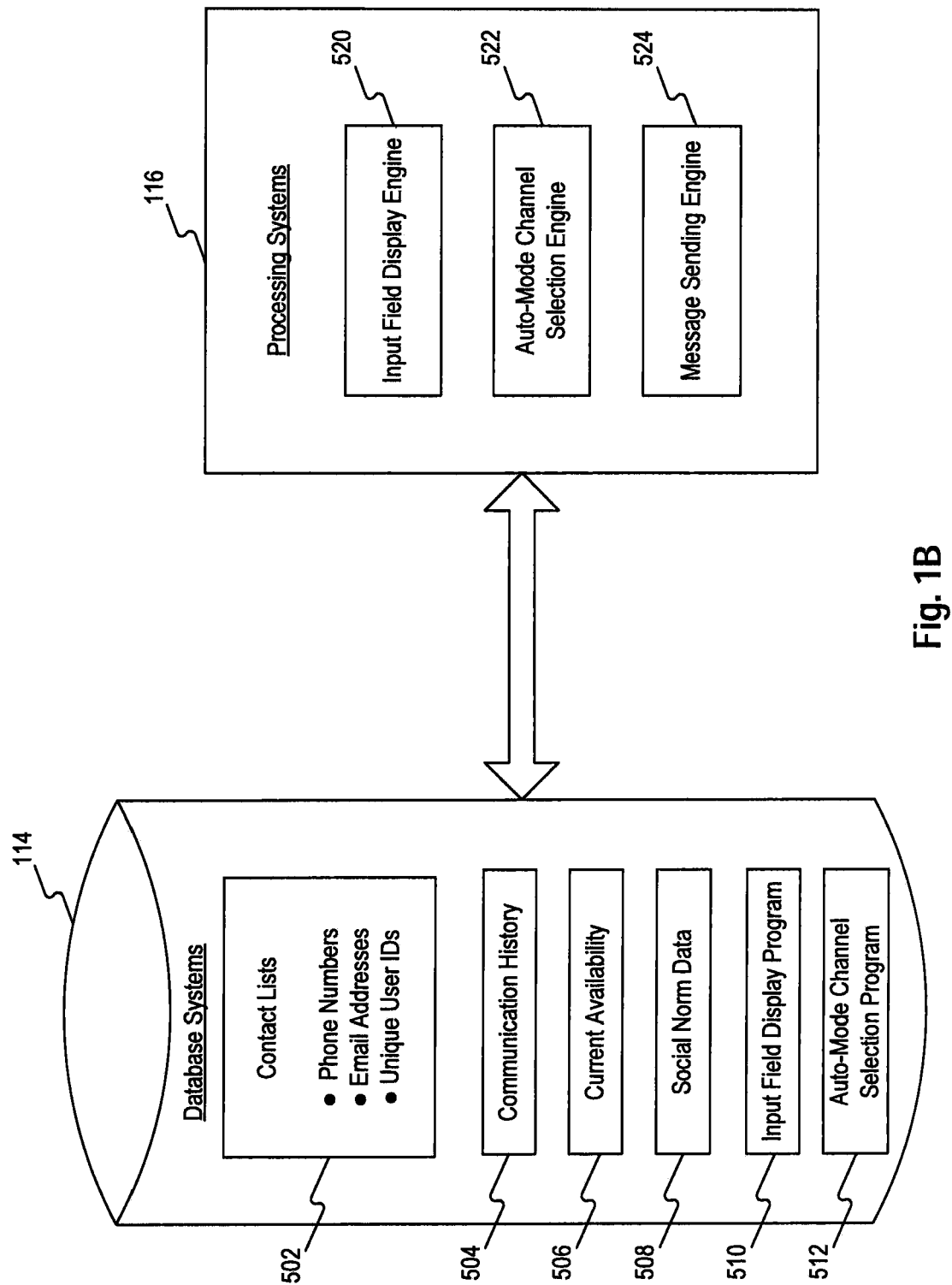
FIG. 1B is a block diagram of an exemplary back-end system of communications system, consistent with embodiments of the present disclosure.

As will be described in more detail below, database systems 114 may be implemented as one or a series of physical storage devices configured to store data and instructions for implementing a universal input field and distributing electronic messages over varied communication channels. As shown in FIG. 1B, database systems 114 may include the storage of contact lists 502, including phone numbers, email addresses, unique user IDs, or other identifiers stored in a profile for users in communications environment 100. In one embodiment, contact lists 502 may include information for users who have registered using web servers 106, as well as friends and other contacts of those registered users. As will be appreciated by those of skill in the art, any users of the Internet may register with the network by providing, e.g., a username, password, and other identifying information. Alternatively, users may register with the network using partner log-in data, or universal log-ins that are recognized and accepted by the network.

Registered users may then create a profile having contact information, such as an email address and/or phone number. Registered users may also store preferences defining how they wish to be contacted. For example, users may indicate that they prefer to be contacted by one communication channel over another, or in a sequence of preferred channels. Similarly, users may indicate that they prefer to be contacted by certain channels based on the identity of the person contacting them, the time of day, day of week, their location, etc. Database systems 114 may store such preference information, and make it available to the system when it is performing automatic selection of a communication channel. Database systems 114 may also store users' communication history 504, users' current availability 506, and users' social norm data 508.

In addition, database systems 114 may store instructions or computer programs for performing the methods disclosed herein. For example, database systems 114 may store an input field display program 510 for controlling how a universal input field is displayed and modified based user interaction. Database systems 114 may also store an auto-mode channel selection program 512 for automatically selecting a communications channel for a user, as disclosed in more detail herein.

Processing systems 116 may be implemented as one or more processors configured to execute instructions stored in database systems 114, for implementing a universal input field and distributing electronic messages over varied communication channels. As shown in FIG. 1B, processing systems 116 may include various modules or engines for processing data, including but not limited to an input field display engine 520, an auto-mode channel selection engine 522, and a message sending engine 524. Input field display engine 520 may execute input field display program 510, for controlling how a universal input field is displayed and modified based user interaction. Auto-mode channel selection engine 522 may execute auto-mode channel selection program 512 for automatically selecting a communications channel for a user, as desired.

Figure 2:
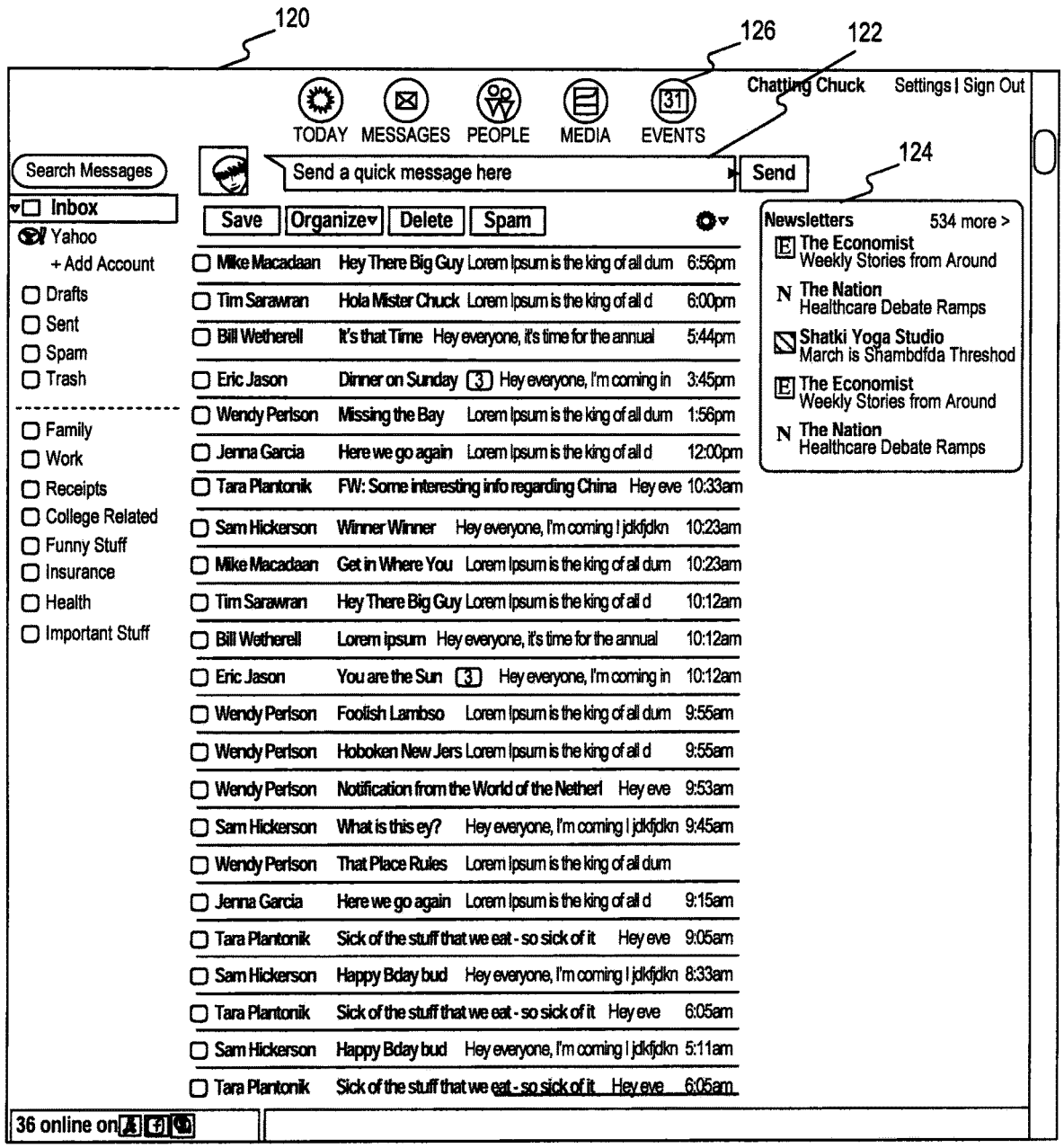
FIG. 2 is a screenshot of a web portal including an exemplary universal input field, consistent with embodiments of the present disclosure.

As described above, embodiments of the present disclosure may include displaying a universal input field for managing and distributing messages. The universal input field may be provided in connection with, for example, a website, online portal, webmail interface, or mobile device. FIG. 2 depicts a screenshot of an exemplary web portal 120 including an exemplary universal input field 122. Universal input field 122 may be generated by input field display engine 520 according to input field display program 510, and configured to display data to users and receive input from users. In one embodiment, universal input field 122 may initially be displayed including the instructions, "Send a quick message here . . . " along with a "Send" button to the side of the universal input field 122. As described above with respect to FIG. 1A, web servers 106 may be configured to operate web portal 120, by making it available for display on email clients 102 and/or mobile devices 112. In one embodiment, the universal input field 122 may be positioned at the top of an inbox of web portal 120. Of course, it will be appreciated that universal input field 122 may be positioned anywhere in an inbox or web portal, in any size, shape, or position relative to an inbox or web portal.

In one embodiment, all of a user's emails, messages, social networking updates, etc. may be displayed in web portal 120 in a list view by order of receipt, for example. Each listed communication may include the name of a sender or poster, a post time or time since receipt, a preview of a message, and/or an avatar or thumbnail picture associated with the sender or poster. In general, web portal 120 may perform email aggregation in the general format of a web-based email system (i.e., "webmail"). When a user logs-on to the portal, the user may be presented with a combination of emails from various personal email accounts, but not with unwanted spam or other categories of messages until they are selected. The portal may add all of a user's news and/or blogs to the portal in a newspaper format 124 and allow the user to aggregate all social networking updates, pictures, etc. in the e-mail portal. Furthermore, web portal 120 may allow a user to move specific emails, or even specific emails and emails similar to those emails, to the newsletter area. By scanning incoming mail, the portal may also be able to auto-categorize e-mail, and pick out events and add them to a user's calendar 126. The portal may also perform social aggregation so as to combine all of a user's social inputs, including text, photos, videos, links, people, mail, media, events, contacts, etc. The user can also share photos, videos, etc. or post them directly to any social networking site.

Web portal 120 may also incorporate instant messaging services in the portal, through any of the email or social networking accounts added to the portal. A user may search all of the user's emails, messages, social networking communications, events, albums, etc. or any other text associated with the user's portal, using a single search mechanism. Web portal 120 may also display online content relevant to search terms entered into a spotlight search, through a search drop-down menu. Thus, even if a user only plans on searching the user's own communications, the portal might direct the user to content outside of the user's portal. The relevant web content may be displayed not just in a search drop-down menu, but also adjacent to actual search results from the user's portal.

Web portals and similar mobile programs may aggregate numerous modes or channels of communication, any of which a user may desire to leverage when communicating with the user's contacts. To facilitate such communication, as will be described in more detail below, universal input field 122 may allow users to enter messages for distribution over one or more communication channels, by selecting or inputting: (1) a selected communication channel (e.g., "e-mail," "SMS," "IM," "Tweet," "Status," etc.), (2) one or more target recipients (e.g., "John," "Sue," "Friends," "Family," etc.), and (3) a message intended to be delivered to the target recipients through the selected communication channel. For instance, a user may simply type into universal input field 122 the phrase, "IM John See you later" to automatically send John an instant message that says, "See you later." Alternatively, a user may type, "Email Bill Hey Bill, Let's watch Avatar soon," to automatically send Bill an email that says, "Hey Bill, Let's watch Avatar soon." Alternatively, the user may type "Share Friends I'm bored" to update the user's friends via a social networking account. The user may also type "SMS" or "Text" to send communications through cellular network 110. The user may also simply type "Status I'm at work" to update a social networking status, including a status on Facebook, Lifestream, Twitter, or any other social network. In each case, message sending engine 524 of processing systems 116 may parse and process the inputs to universal input field 122, and manage distribution of the desired message over electronic network 101 and/or cellular network 110. In one embodiment, a user may elect to send an electronic message over two or more channels. For example, the user may select two or more of: e-mail messaging, SMS text messaging, instant messaging, social network messaging, social network updating, etc., and send the same message to one or more recipients over the plurality of selected channels.

Certain communications channels may require or offer a selection of target recipients, whereas others may be broadcast publicly to anyone. Moreover, the universal input field 122 may interface with various social media providers, such as Facebook and Twitter, as well mobile communications services, such as AT&T or Verizon. Thus, the portal may obviate the need for users to open new windows, because the portal can send and receive messages using any service (IM, SMS, etc.), access multiple address books, and consolidate multiple email or social networking accounts.

In general, universal input field 122 may be used primarily for the purpose of initiating a conversation with other users. That is, it may be used to make first contact within any given conversation. Subsequent communications, such as responses from the recipient, may be shown in relation to the specific communication channels, e.g., in an email string, in a chat/IM window, etc. However, it will be appreciated that universal input field 122 may also be modified to support the display of responses to communications sent through the universal input field 122. For instance, in one embodiment, universal input field 122 could display responses for a limited period of time, to alert the sender to any prompt responses. For example, the universal input field 122 could flash, and/or show a preview of any responses, and then return to its static state.

Figure 3A:
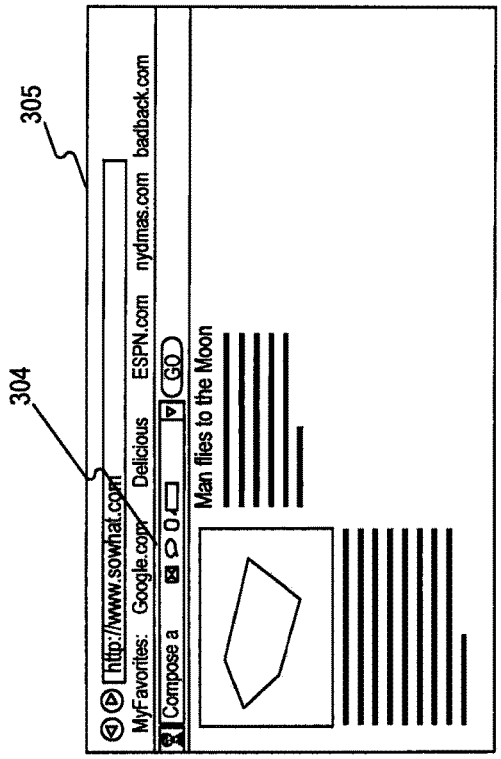
FIGS. 3A-3D illustrate exemplary implementations of a universal input field, consistent with embodiments of the present disclosure.
Figure 3B:
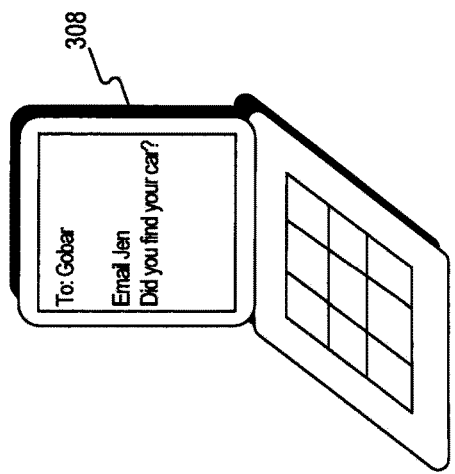
Figure 3C:
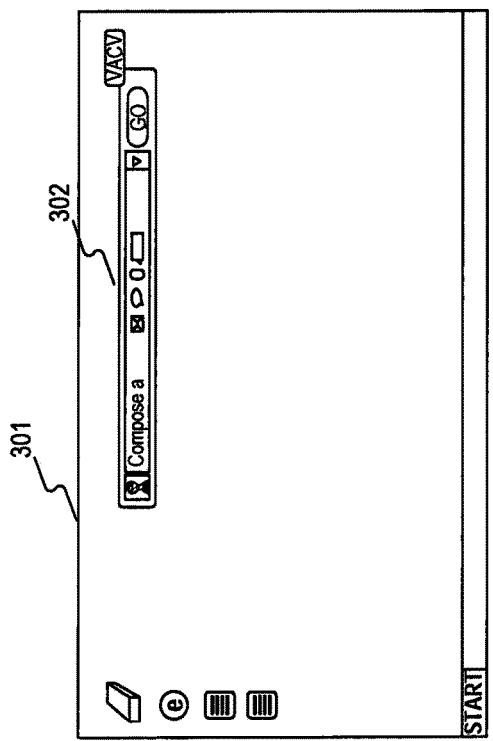
Figure 3D:
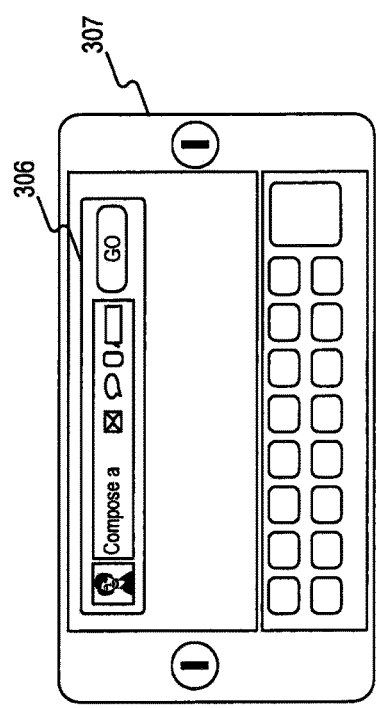

FIGS. 3A-3D display exemplary implementations of a universal input field. FIG. 3A depicts an embodiment in which a universal input field 302 is implemented as part of an application running on, e.g., the "desktop" of an operating system 301. FIG. 3B depicts an embodiment in which a universal input field 304 is implemented as a toolbar of a web browser 305. FIG. 3C depicts an embodiment in which universal input field 306 is an application running on a mobile device 307. FIG. 3D depicts an embodiment in which a universal input field is operated as an SMS interface on a mobile device 308. In certain embodiments, the universal input field may be implemented as a recipient named "GoBar," "QuickBar," or any other easy-to-remember recipient name configured to receive a selected communication channel, one or more recipients, and a message. The embodiments of FIGS. 2 and 3A-3D are not to be construed as limiting, but rather as examples of how a universal input field may be embodied in or using virtually any type of operating system, software, or device.

Figure 4:
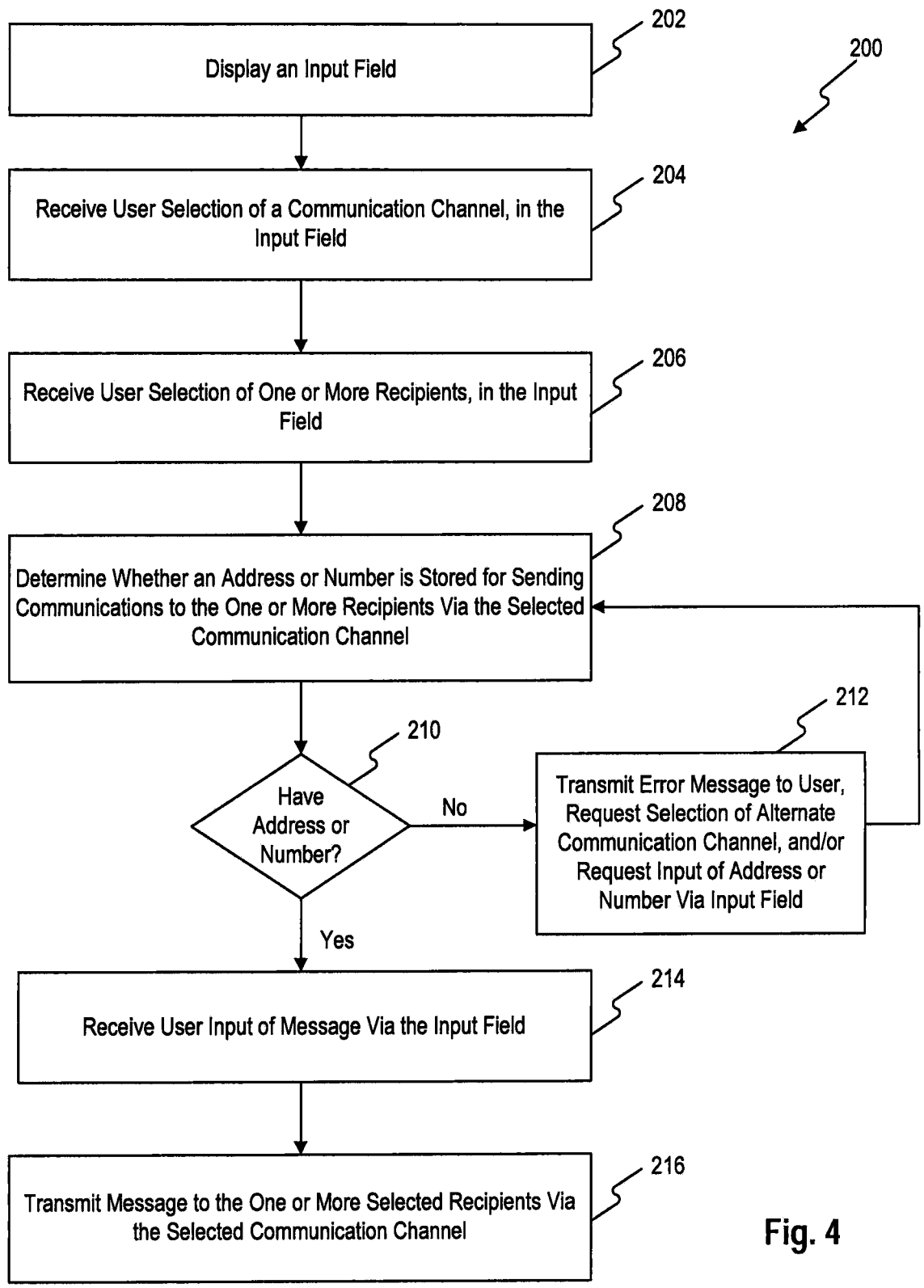
FIG. 4 depicts an exemplary method for displaying a universal input field and distributing messages through varied communication channels, consistent with embodiments of the present disclosure.

FIG. 4 depicts an exemplary method 200 for displaying a universal input field and electronically distributing messages through communication channels. Method 200 may include displaying an input field (Step 202). The input field may be any suitable type of user interface, such as a text field, plurality of buttons, drop-down menus, forms, etc. As described with respect to FIGS. 2 and 3A-3D, an input field may be displayed on any type of operating system, software, or device. Database systems 114 may store instructions for displaying a universal input field, based on the type of operating system, software, or device, and for modifying the displayed universal input field based on user interaction.

Method 200 may further include receiving a user's selection of a desired communication channel, in the input field (Step 204). In one embodiment, the input field may include icons representative of different communication channels, which a user may select with a mouse, pointer, or touchscreen. Alternatively, a user may select a communication channel by starting to type, in the input field, the words, "email," "text," "IM," "status," etc., among other available communication channels. In one embodiment, drop-down menus may automatically appear when a user is typing in a communication channel, based on the available communication channels.

Method 200 may further include receiving a user's selection of one or more recipients, in the input field (Step 206). For example, a user may type recipient names into the input field, select icons representing the user names, and/or use other interface mechanisms to identify desired recipients of a message. In one embodiment, drop-down menus may also appear when a user is typing in a recipient's name, based on contacts stored in the portal. Alternatively, the input field may display all available contacts from the user's address book or other contact list. In one embodiment, the input field may only list those contacts having contact info for the selected communications channel.

Method 200 may further include determining whether an address, phone number, unique ID, or another identifier is stored for sending communications to each recipient via the selected communications channel (Step 208). By way of example, if the user has elected to "email" his friend "Joe," step 208 may include confirming whether an email address is stored in database systems 114 for Joe. If the user has elected to "text" his friend "Sue," step 208 may include confirming whether a mobile number is stored in database systems 114 for sending SMS messages to Sue. If a suitable address, phone number, unique ID, or other identifier is not stored in database systems 114 for the one or more recipients (Step 210: "No"), then method 200 may further include transmitting an error message to the user, requesting the user's selection of an alternate communications channel, and/or requesting that the user input a suitable address, number or other identifier, via the input field, for any of the selected recipient(s) for which such an identifier is not already stored in database systems 114 (Step 212). If a suitable address, phone number, unique ID, or other identifier is indeed stored in database systems 114 for the one or more recipients (Step 210: "Yes"), then method 200 may further include receiving user input of a message via the input field (Step 214). In one embodiment, method 200 may perform the determining step 208 while a user is already entering a message into the input field. The user's message may be received as keystrokes, taps, touchscreen swipes, voice commands, or any other known techniques for inputting, processing, and/or receiving textual data.

Once a user has entered a message and indicated completion and desire to send the message (e.g., by clicking a "Send" button or hitting an "Enter" key), then method 200 may further include transmitting the message to the one or more selected recipients through the selected communication channel (step 216). For example, if the selected communication channel is email, then back-end system 108 may send the email components or even a fully-assembled email to email servers 104, through web servers 106, for delivery. If the selected communication channel is an SMS message, then back-end system 108 may send a desired SMS message to cellular network 110, through web servers 106, for delivery to SMS clients (e.g., mobile devices 112). In any case, message sending engine 524 of processing systems 116 may parse the received information, including channel selection, recipient(s), and message, and process the communication for delivery over electronic network 101 and/or cellular network 110.

Figure 5:
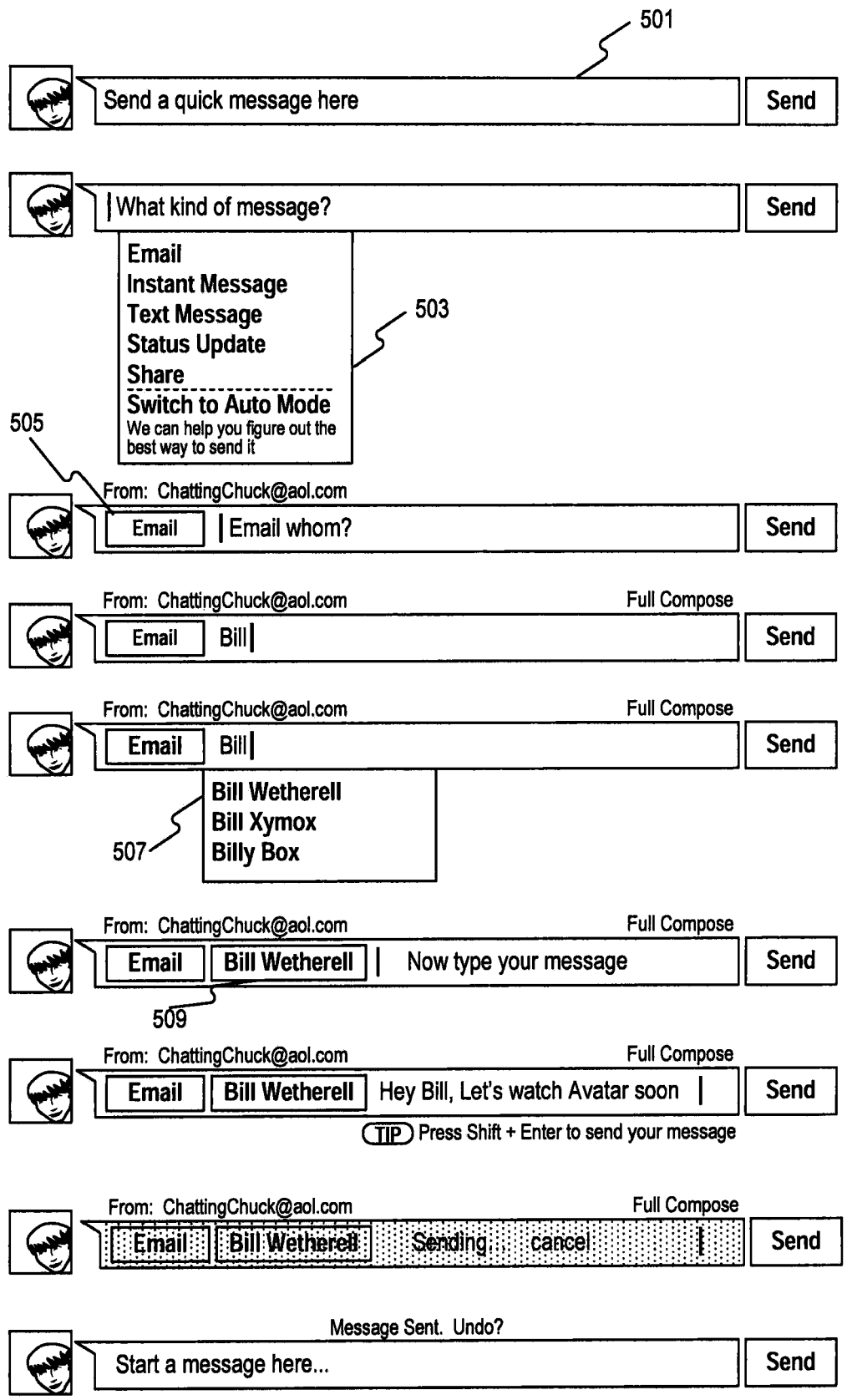
Figure 6:
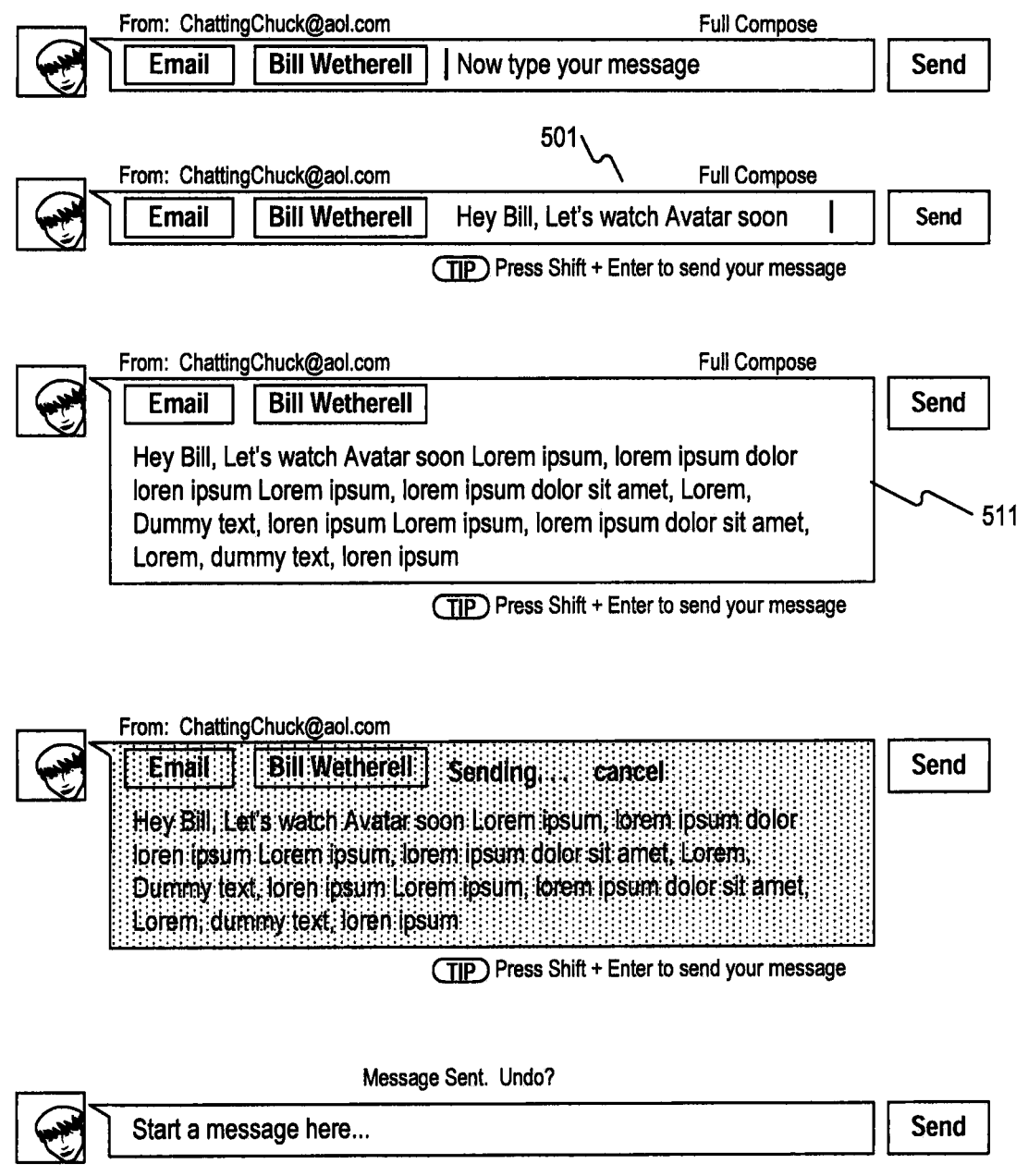

FIGS. 5-11 depict screenshots of exemplary embodiments of a universal input field, and flow diagrams for exemplary methods of displaying and manipulating a universal input field for receiving and transmitting messages over varied communications channels. FIG. 5 depicts an exemplary input field 501 that displays the instructions, "Send a quick message here . . . " When a user places a cursor into the input field, the instructions may be modified to read, "What kind of message?" and a drop-down menu 503 may appear for providing the user with a selection of available communication channels, including but not limited to, "Email," "Instant Message," "Text Message," "Status Update," "Share," and "Switch to Auto Mode" (the Auto Mode being an automatic selection of a communication channel based on predetermined criteria, as will be described in more detail below). As shown in FIG. 5, if a user has selected "Email," an email icon 505 may be displayed in the input field, and the user's "From" email address (e.g., ChattingChuck@aol.com) may be displayed above the input field. Once a user has moved the cursor to the right of the email icon, the input field may also modify the instructions to say, "Email whom?" The user may then begin to type one or more recipient names into the input field. As shown in FIG. 5, a drop-down menu 507 may be displayed for providing the user with a selection of available contacts for whom an email address is stored. The user may arrow down to, or click on, one or more of those contacts, whose icons 509 may appear in the input field. As described above, in one embodiment, the system may only display those contacts for whom an address, phone number, unique ID, or other identifier is stored in relation to the already-selected communications channel. For instance, based on the selected communication channel, the input field display engine 520 may search contact lists 502 for suitable contact information. The input field instructions may then be modified to say, "Now type your message" A user may then type the message that the user desires to send, in this case, to "Bill Wetherell" by "Email." Upon finishing entering the desired message, the user may click a "Send" button or hit an "Enter" key, and the input field may darken while the message is being sent, before refreshing to its original state, for receipt and sending of another communication. FIG. 6 depicts an embodiment of universal input field 501, whereby, if a user begins to type more than a preset number of characters or words into the message, the input field will expand into an expanded input field 511, which is expanded sufficient to display all of or at least more of the user's input message.

Figure 7:
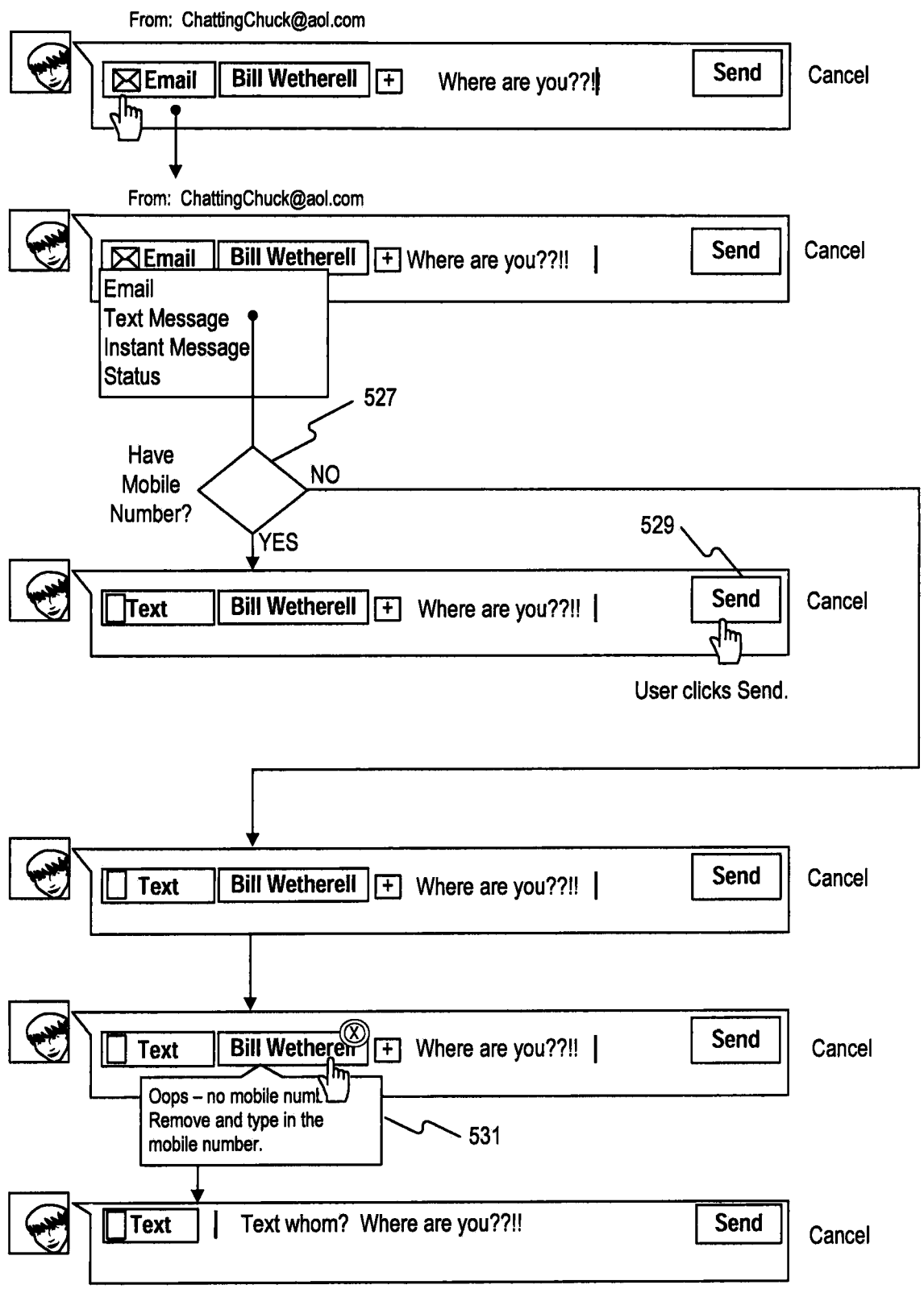
Figure 8:
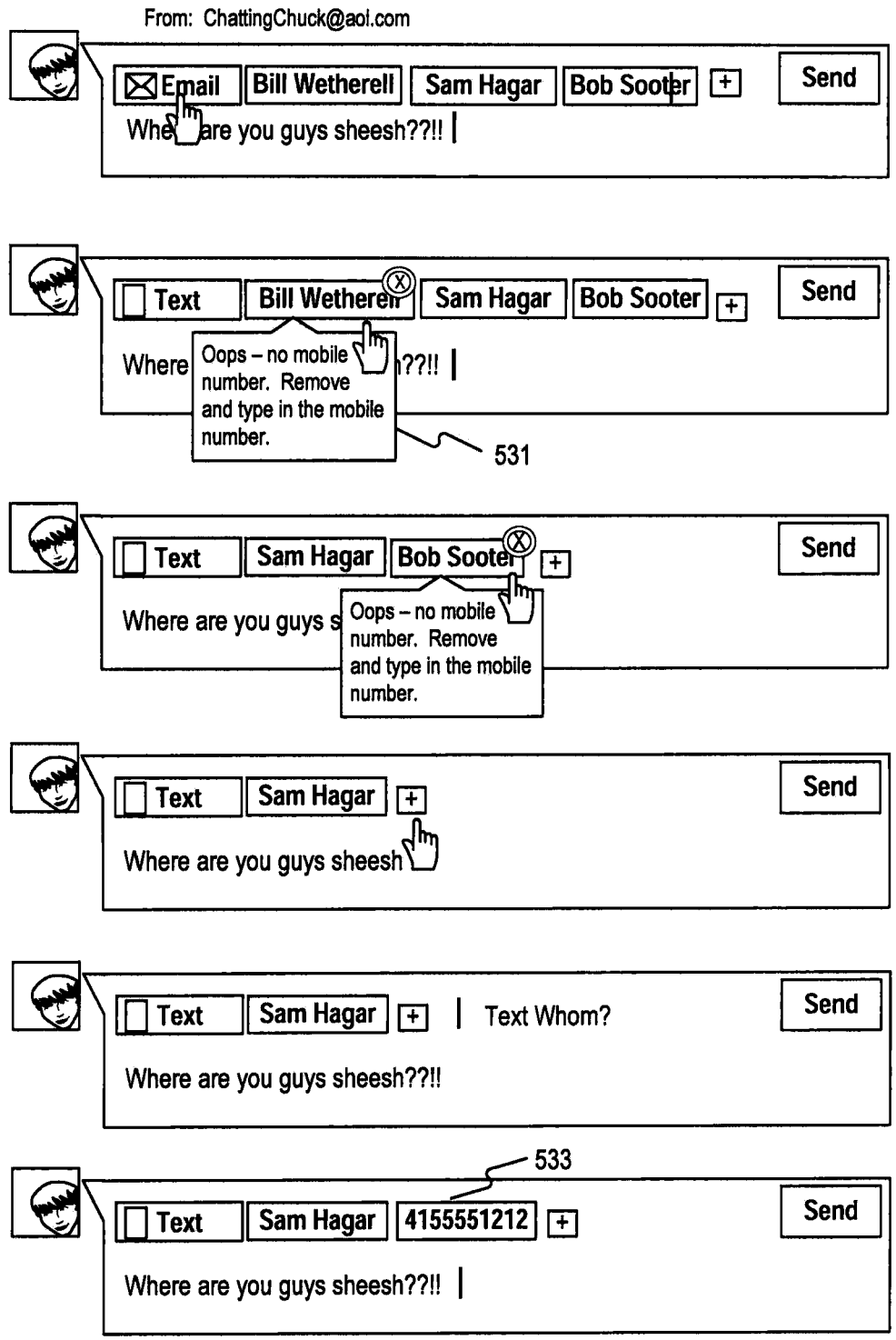

FIG. 7 depicts another exemplary flow of universal input fields where, upon entry of a selected communication channel (in this case, "Email") and a selected recipient (in this case, "Bill Wetherell") the system may perform a step 527 of determining whether sufficient contact information is stored to send a communication to the selected recipient via the selected communications medium. As discussed above, the input field display engine 520 may search contact lists 502 for suitable contact information. If sufficient contact information is stored in database systems 114, the user is allowed to proceed with typing a message and hitting the "Send" button 529. If sufficient contact information is not stored, the user is informed by notice 531 and asked to supply the needed information. FIG. 8 shows an example of how, once a user has received a notice 531 that insufficient contact information is stored for sending a message to the selected recipient through the selected communications medium, the user may instead enter such contact information directly as a recipient. By way of example, FIG. 8 shows how the user can simply enter a phone number 533 as the desired recipient. Of course, the user could alternatively enter the contact information into a recipient profile, or select an alternate recipient.

Figure 9:
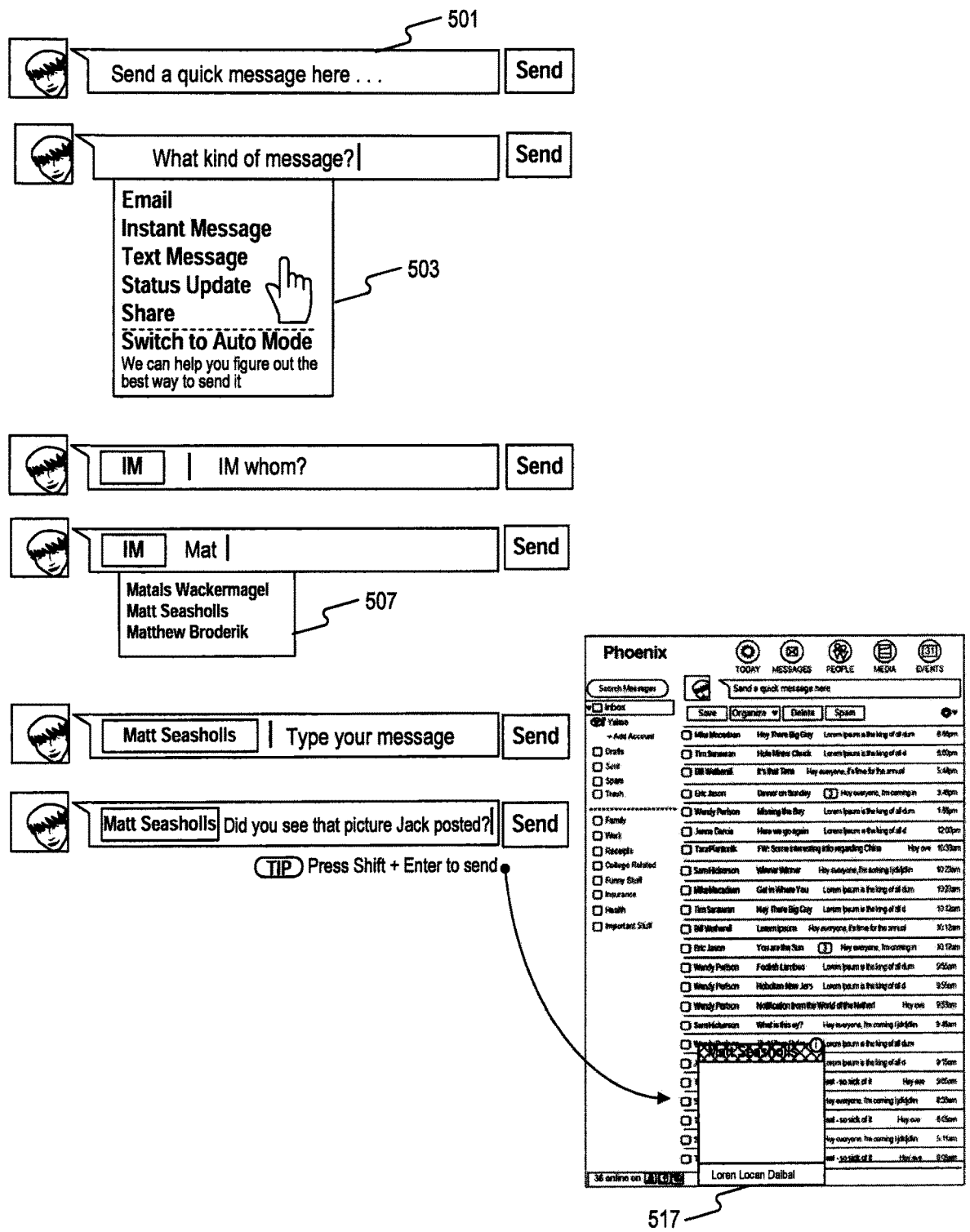

FIG. 9 depicts an exemplary embodiment of universal input field 501 where a user has selected "IM" as the desired communications channel from a drop-down list 503 of available communications channels. In addition, a user has selected a recipient from a drop-down list 507 of available recipients. As shown in FIG. 9, once the user has entered a message and hit "Send," the desired instant message may appear within an instant messaging window 517, for example overlaying an inbox, website, or other web portal. Thus, universal input field 501 may be a convenient mechanism for users to easily initiate instant messaging conversations, by simply selecting "IM" and entering a recipient and message into a field at the top of an inbox.

Figure 10A:
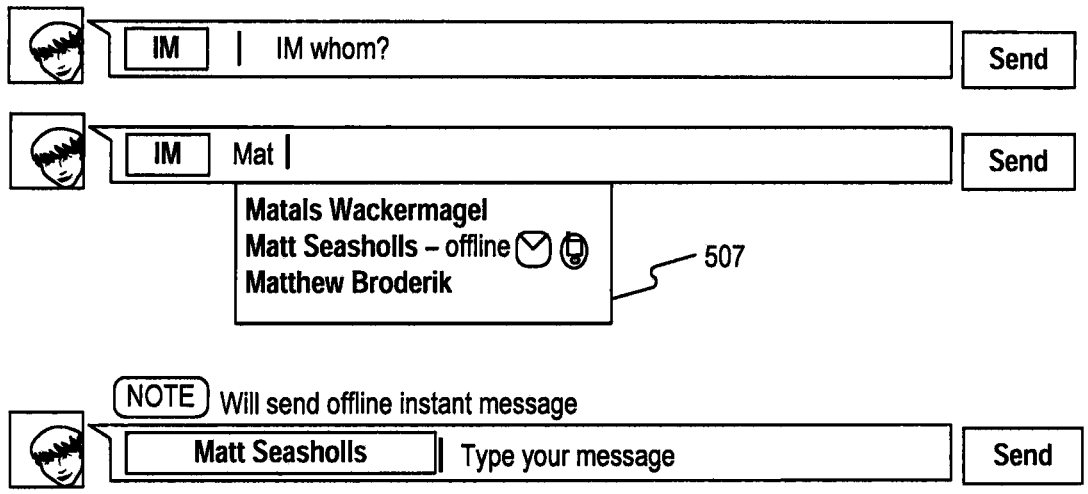

FIG. 10A shows an example of how, when a user has selected "IM" as the desired communications channel, the universal input field may display a drop-down recipient list 507 that shows whether the potential IM recipients are "online" and available for IM messaging, or "offline" and unavailable for IM messaging. For example, input field display engine 520 may search current availability database 506 in database systems 114 to cross-reference the potential recipient list against users that are "online."

Figure 10B:
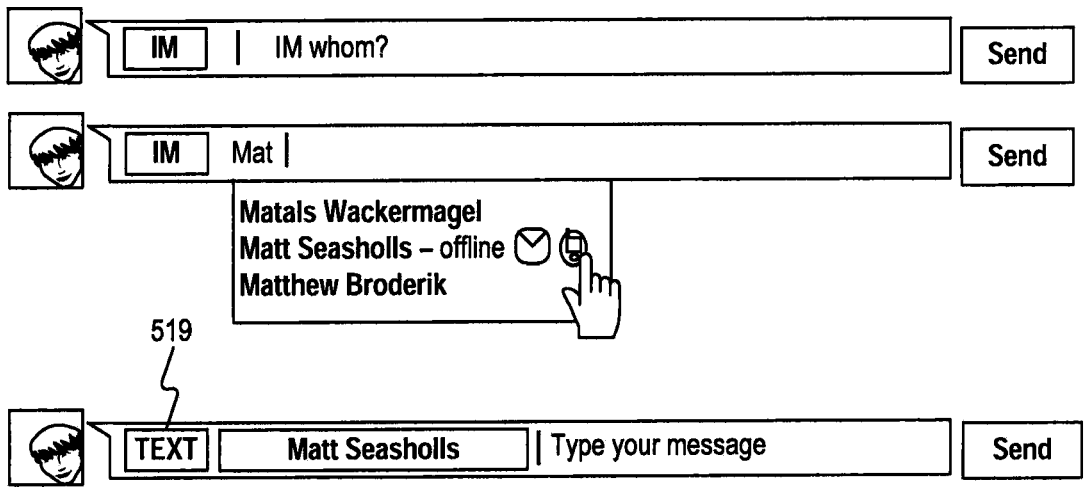

FIG. 10B shows another example of how, when a user proceeds with IM messaging a user who is offline, the universal input field may automatically switch to a more suitable communications channel (in this case "Text" channel 519). Alternatively, even if a recipient user is "offline" and therefore unable to receive instant messages, an instant message may be sent to the recipient's email or other communications portal and delivered to the recipient when they are back online. For instance, for those users that do not appear as "online" upon a search of current availability database 506 in database systems 114, the input field display engine 520 may alternatively search contact lists 502 for an alternate address or phone number.

Figure 11:
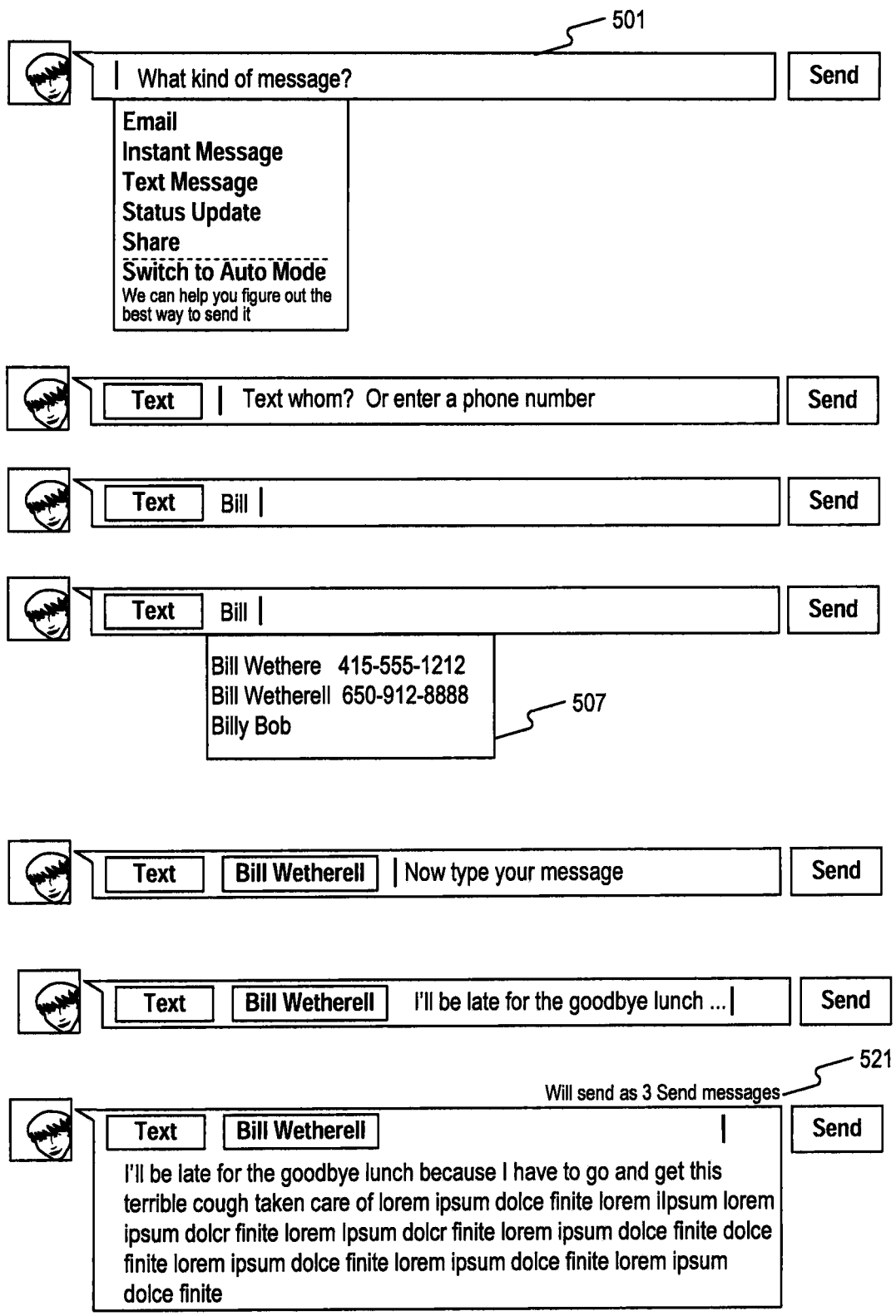

FIG. 11 shows an exemplary embodiment of universal input field 501 in which a user has selected "Text" as the desired communications channel. More specifically, once has a user has selected "Text" (i.e., SMS messaging via cellular network 110), a drop-down recipient list 507 may show contacts having mobile numbers that can be text messaged. Moreover, because SMS messaging may include character or word limits, the universal input field 501 of FIG. 11 may display at note 521 how many messages will be sent (in this case, 3) to send the user's entire desired message by SMS.

Figure 12:
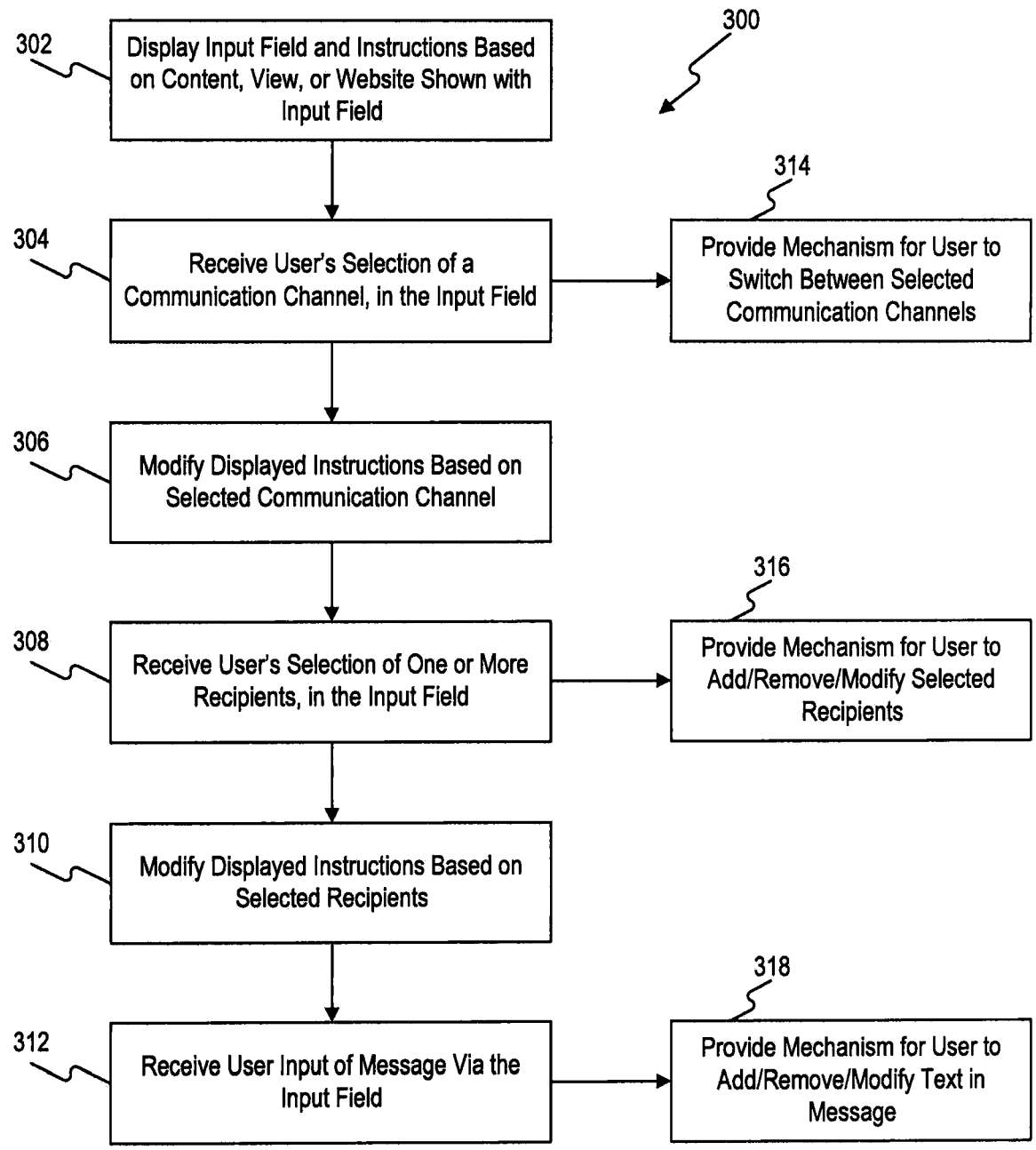
FIG. 12 depicts a flowchart of another exemplary method for implementing a universal input field, consistent with embodiments of the present disclosure.

As described above, universal input fields may be flexible and allow for various manipulations by users, for the purpose of switching between communications channels, adding/subtracting recipients, and changing the desired message. FIG. 12 depicts a flowchart of another exemplary method 300 for implementing a flexible and useful universal input field. In particular, method 300 may include displaying an input field and instructions based on the content, view, or website shown with the input field (Step 302). For example, the displayed input field and instructions may vary depending on whether they are displayed on a mobile device or web browser.

Method 300 may include receiving a user's selection of a communications channel, in the input field (Step 304). In one embodiment, the input field may include icons representative of different communication channels, which a user may select with a mouse, pointer, or touchscreen. Alternatively, a user may select a communication channel by starting to type, in the input field, the words, "email," "text," "IM," "status," etc., among other available communication channels. In one embodiment, drop-down menus may automatically appear when a user is typing in a communication channel, based on the available communication channels. Method 300 may further include providing a function by which a user can switch between selected communications channels (Step 314). For example, a user can click on an icon of the already-selected communications channel to display a drop-down list of alternate communications channels. Method 300 may then include modifying the displayed instructions based on the selected communications channel (Step 306). For example, if the user has selected "Email" as the desired communications channel, the input field may display the words "Email whom?", and so on.

Method 300 may further include receiving a user's selection of one or more recipients, in the input field (Step 308). For example, a user may type recipient names into the input field, select icons representing the user names, and/or use other interface functions to identify desired recipients of a message. In one embodiment, drop-down menus may also appear when a user is typing in a recipient's name, based on contacts stored in the portal. Alternatively, the input field may display all available contacts from the user's address book or other contact list. In one embodiment, the input field may only list those contacts having contact info for the selected communications channel. Method 300 may further include providing a function for the user to add, remove, and/or modify selected recipients (Step 316). For example, by mousing over icons for already-selected recipients in the input field, buttons may be displayed that the user can manipulate to delete or add users. Method 300 may then include modifying the displayed instructions based on the selected recipients or user interaction (Step 310). For example, if the user has selected at least one recipient, or if the user has indicated that he or she has finished adding recipients, then the instructions may be modified to read, e.g., "Type your message here."

Method 300 may further include receiving user input of a message through the input field (Step 312). For example, the user may type the message into the input field, or speak it into the input field by using voice recognition techniques that can be built-in to the input field. Method 300 may then include providing a function for the user to add, remove, and/or modify text in the message (Step 318). For example, the user may use a cursor to highlight, cut, and/or paste text, use a keyboard and/or mouse to select and edit text, or use other known user interface mechanisms.

Figure 13:
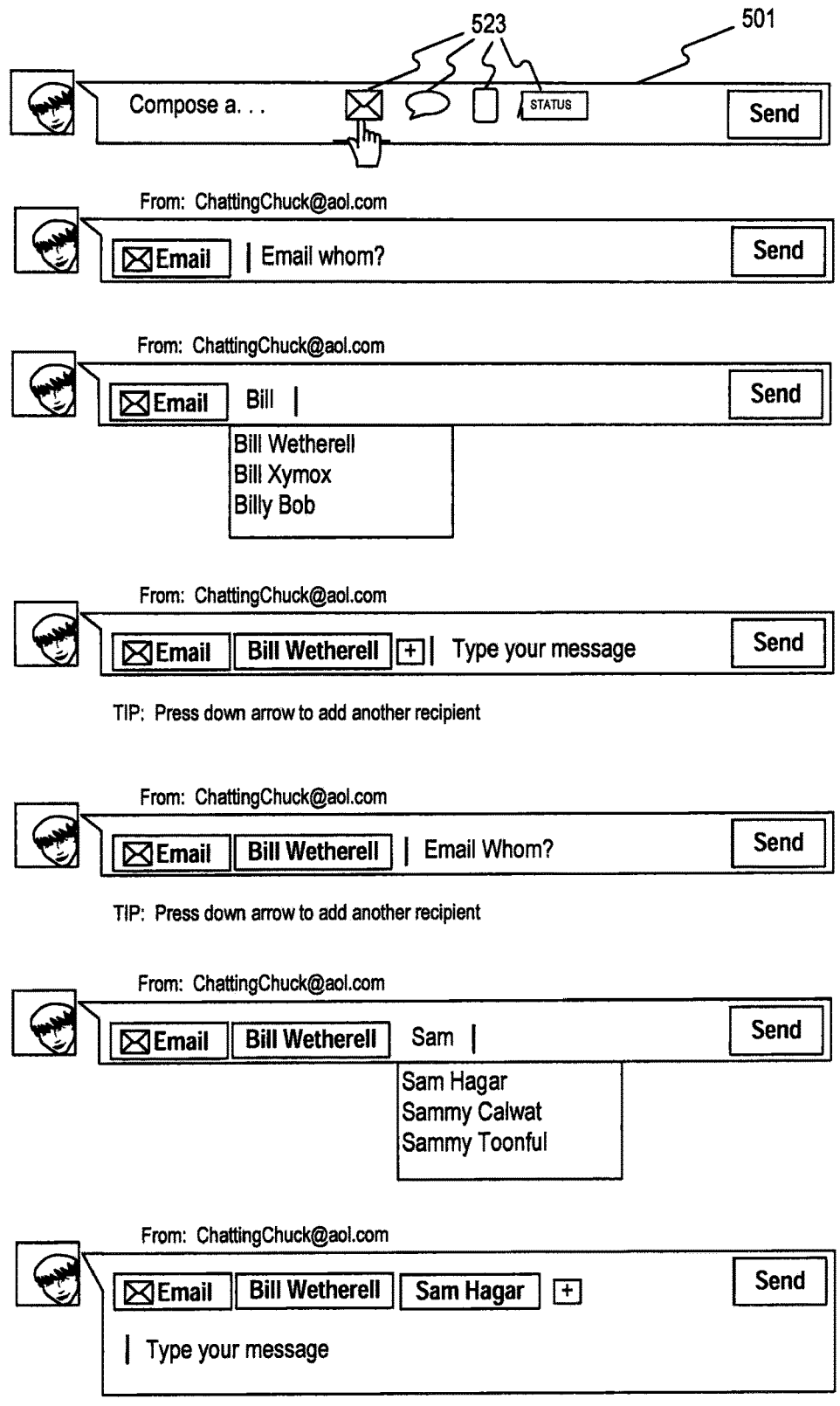
FIGS. 13-17B depict screenshots of additional exemplary universal input fields and process flows for user interaction with such universal input fields, consistent with embodiments of the present disclosure.
Figure 14:
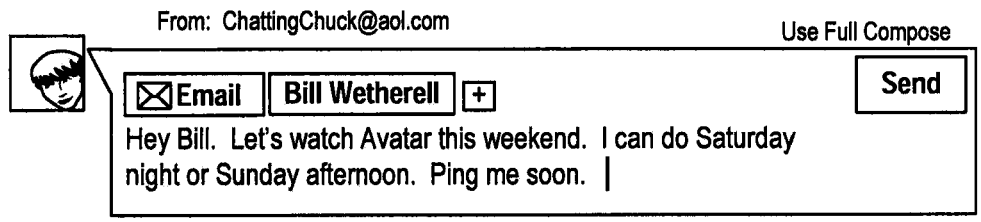
Figure 14:
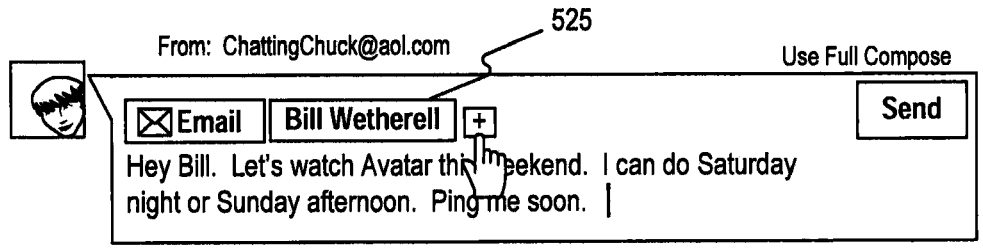
Figure 14:
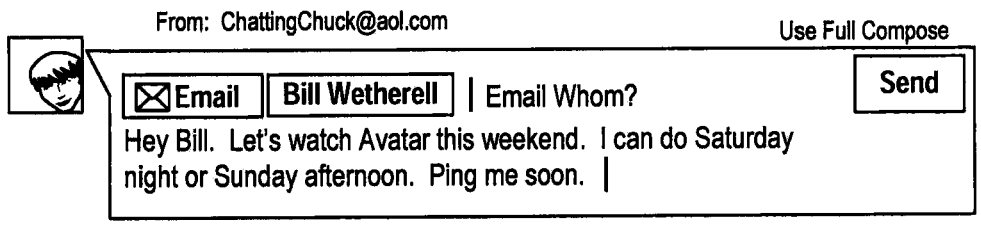
Figure 14:
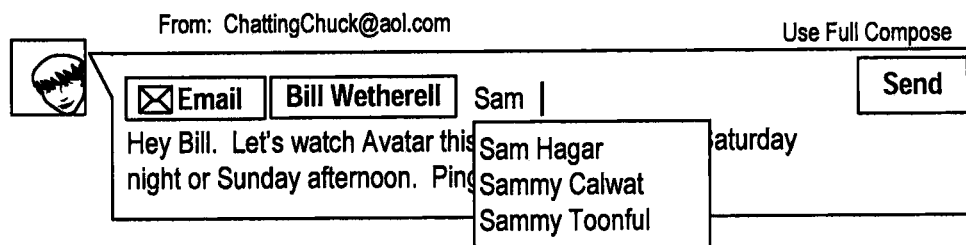
Figure 14:
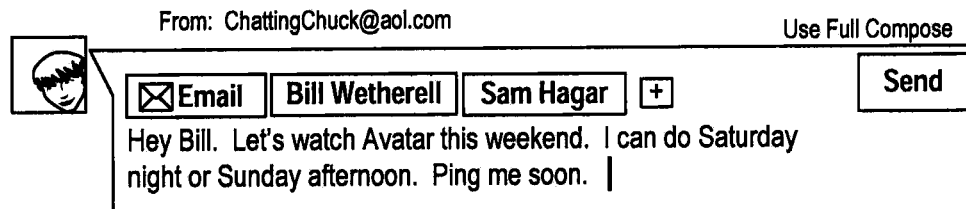

FIG. 13 depicts screenshots of additional exemplary universal input fields 501 and process flows for user interaction with such universal input fields. For example, FIG. 13 depicts a universal input field 501 having icons 523 therein, which a user can click or otherwise manipulate to select corresponding communications channels. Like the earlier-described figures, FIG. 13 shows an example of how a user may begin typing recipient names, select one or more recipients from a drop-down list, and type a message, all by manipulating the universal input field 501. Likewise, FIG. 14 shows an example of how a user may begin typing an email to one recipient, and then mouse over an icon 525 for the last identified recipient to click a "plus" button for adding additional recipients to the "To:" list for the typed email.

Figure 15A:
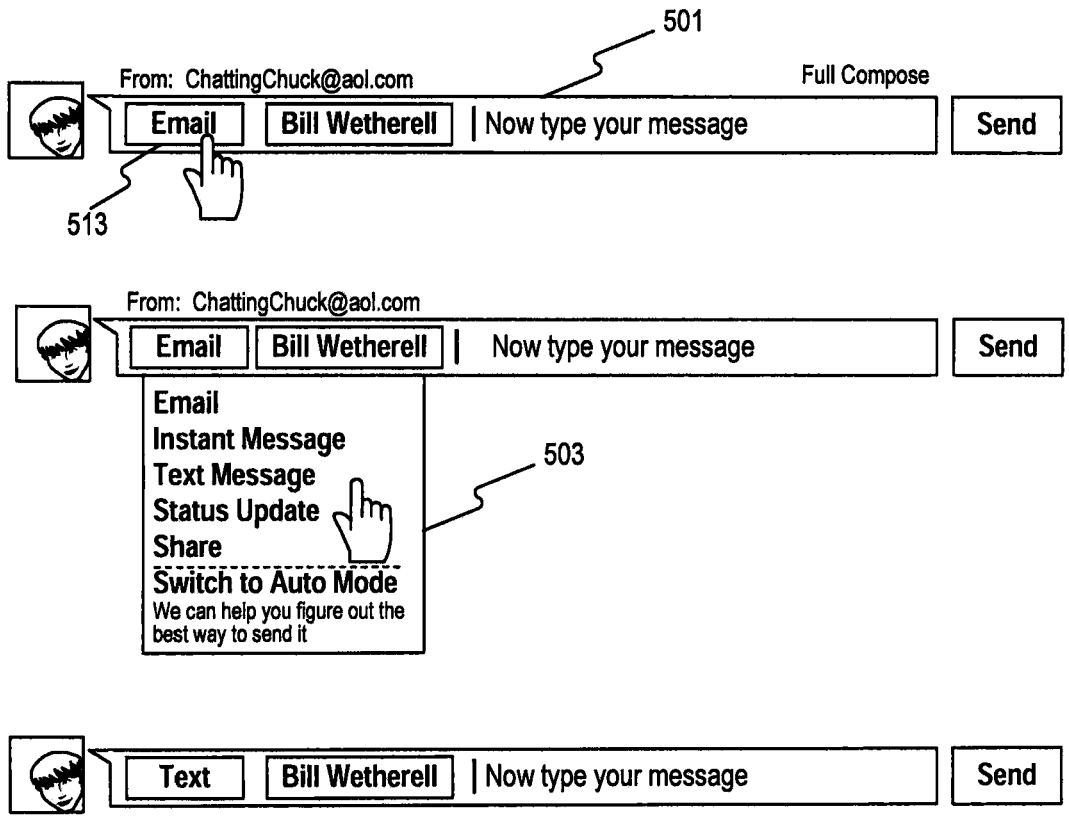

FIG. 15A depicts another exemplary embodiment of universal input field 501, in which a user desires to switch from a selected communications channel to another communications channel. As shown in FIG. 15A, a user may click on an icon 513 of the already-selected communications channel (in this case "Email") to make a communications channel drop-down 503 appear. The user may then click on one of the other available communications channels (in this case "Text Message") to send a message by that other communications channel.

Figure 15B:
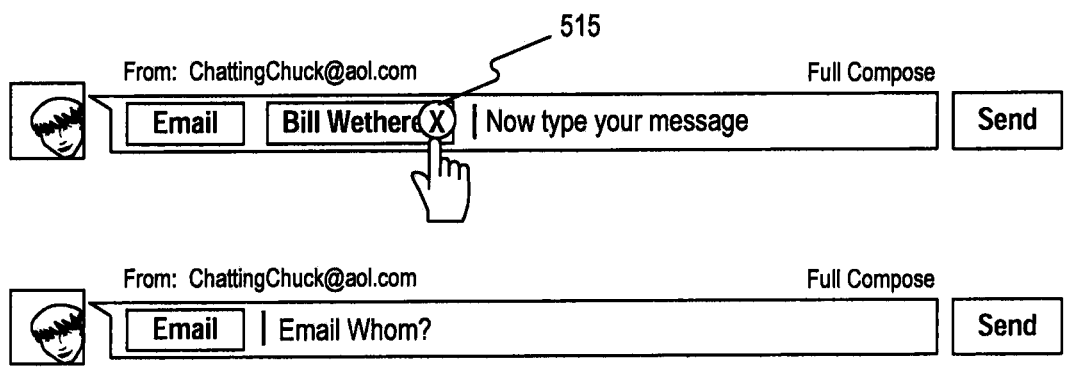

FIG. 15B depicts an exemplary embodiment of universal input field 501 in which, when a user "mouses over" an already-selected recipient, a delete icon 515 appears for removing that recipient from the list of recipients.

Figure 16:
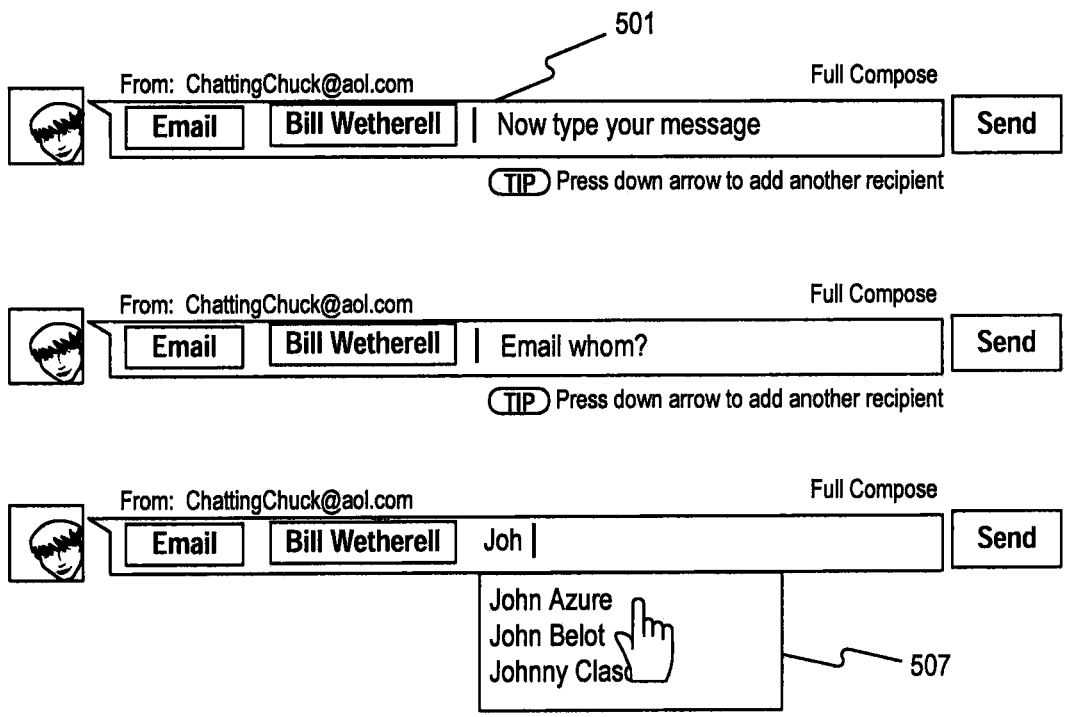

FIG. 16 depicts an exemplary embodiment of universal input field 501 where, after receipt of an indicated recipient, a user is advised to "Press down arrow to add another recipient." or "Press up arrow to start your message." If the user presses the "down arrow" key, a drop-down list of contacts 507 appears based on any characters already typed into the input field, which the user can select instead of finishing typing a recipient's name. As discussed above, drop-down list of contacts 507 can essentially display "auto-complete" options based on one or more first few characters of a recipient name, and can also be limited to show only those recipients for whom contact information is stored for the already-selected communications channel (in this case, "Email").

Figure 17A:
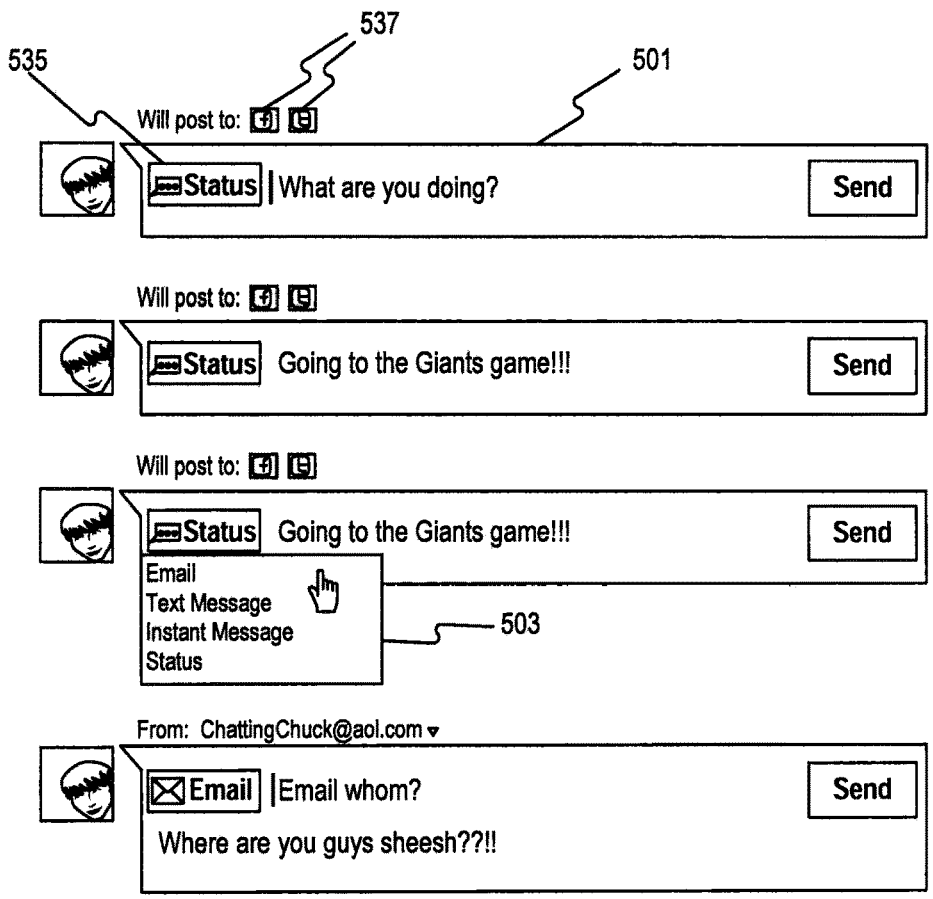

FIG. 17A depicts an exemplary embodiment of universal input field 501 in which a user has elected to send a social networking status update, as evidenced by status icon 535 in the field. FIG. 17A also depicts a plurality of toggle icons 537, each of which represents a social network and which the user can toggle on or off to selectively send the desired social networking update to selected social networks. FIG. 17A also shows how, if a user selects to send a message via communications channel drop-down menu 503, instead of the social networking update, the user may be prompted to select one or more intended recipients, e.g., with the prompt, "Email whom?", since the new channel is not a broadcast communication.

Figure 17B:
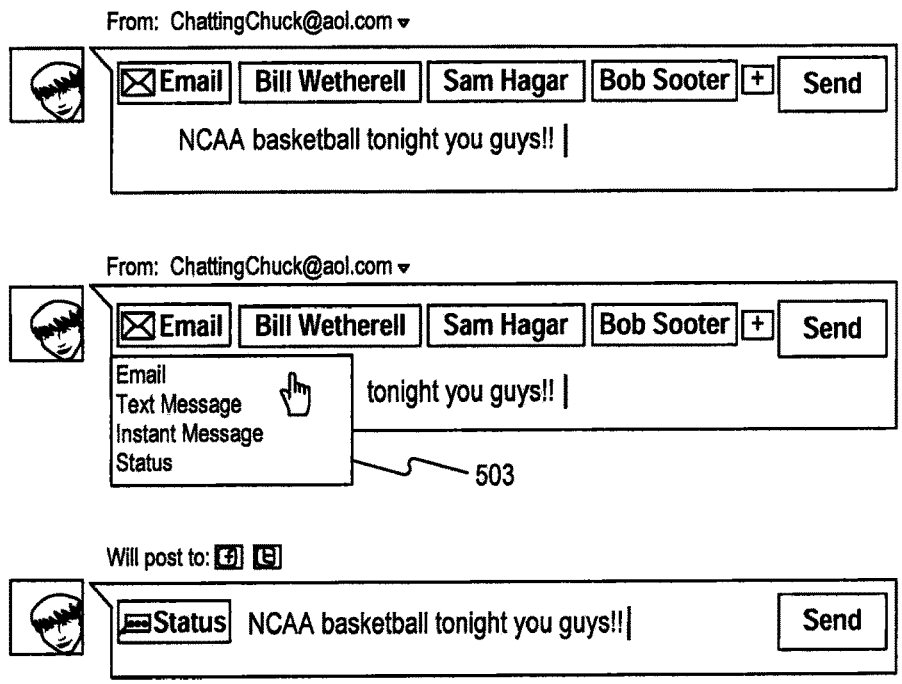

FIG. 17B depicts an example of how, if a user elects to send a status update via communications channel drop-down menu 503, after already having set up a message to one or more recipients, the recipients may be removed since the status update will be a broadcast communications sent to the recipients pre-set in the selected social network.

Figure 18:
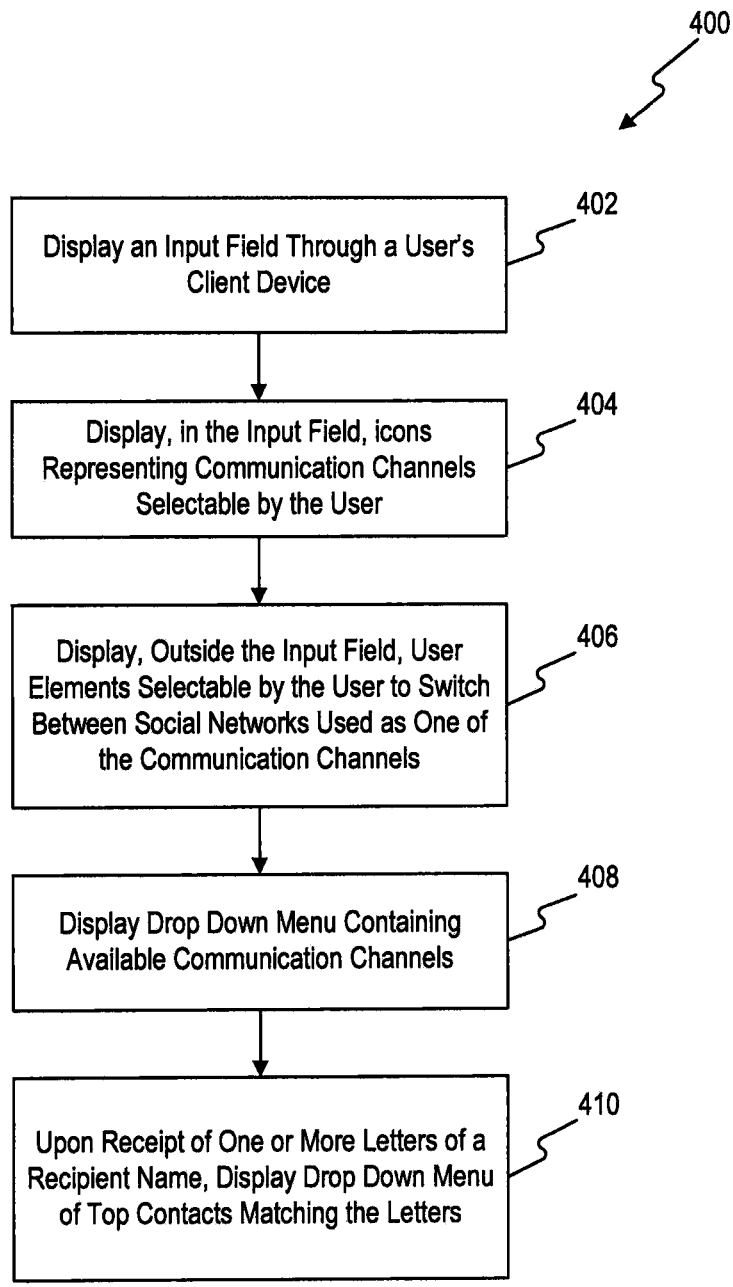
FIG. 18 depicts a flow diagram of another exemplary method for implementing a universal input field, consistent with embodiments of the present disclosure.

FIG. 18 depicts a flow diagram of another exemplary method 400 for implementing a universal input field, particularly in the context of social networking integration. Method 400 may include displaying an input field through a user's client device (Step 402). Method 400 may further include displaying, in the input field, icons representing communications channels that the user can select (Step 404). Method 400 may further include displaying, outside the input field, user elements that the user can select to switch between social networks used as one of the communications channels (Step 406). For example, method 400 may include displaying a plurality of toggle icons above the input field, each of which represents a social network that the user can toggle on or off to selectively include social networks as part of a social networking update within the available communications channels.

Method 400 may further include displaying a drop-down menu containing available communications channels for selection (Step 408.) In one embodiment, a social networking update is listed as one of the available communications channels. In an alternative embodiment, Step 406 is only performed if a social networking update is selected as the desired communications channel. Method 400 may further include, upon receipt of at least one or more letters of a recipient name, displaying a drop-down menu of contact recipients determined as matching the input letters and/or the selected communications channel (Step 410).

Figure 19:
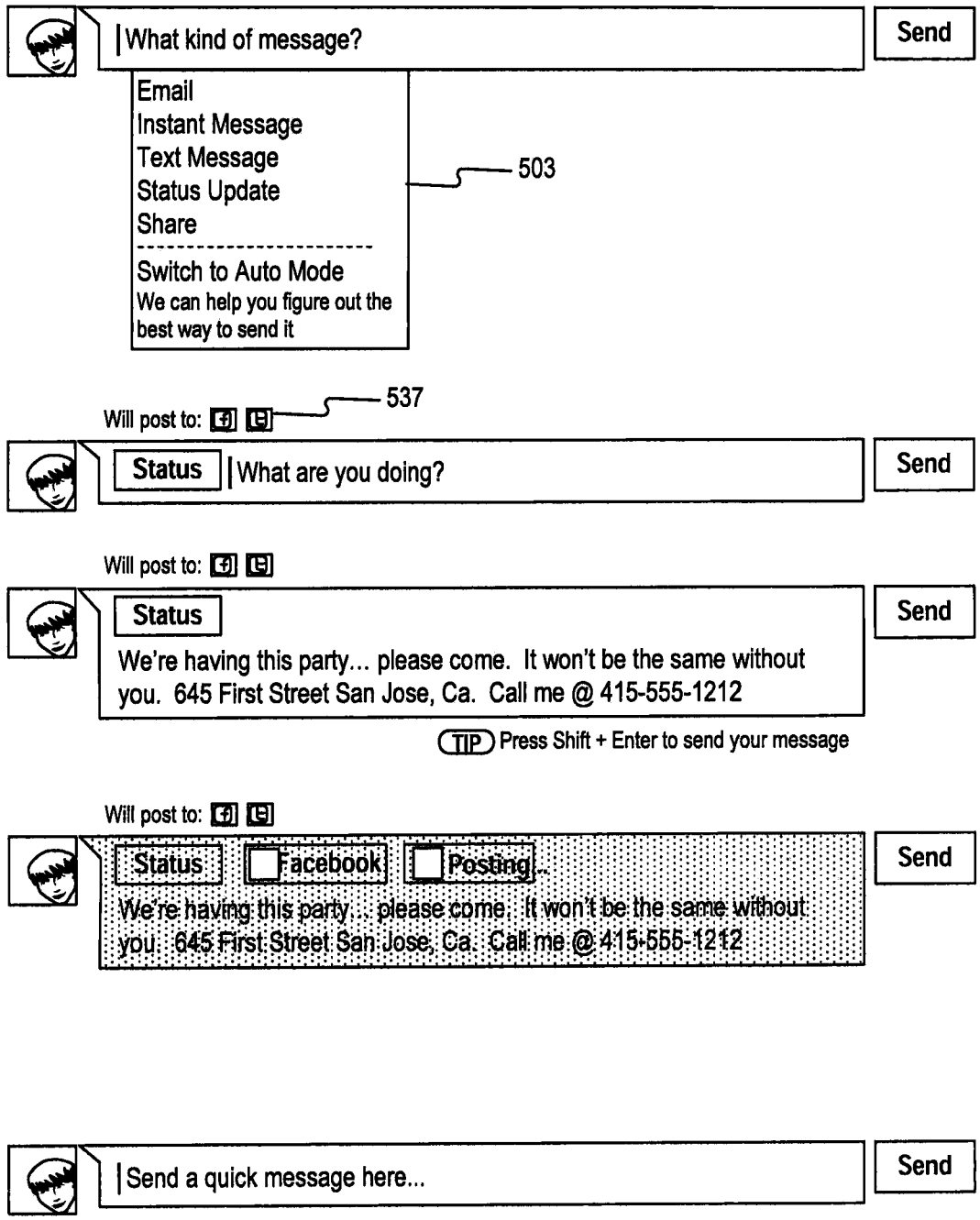
FIGS. 19 and 20 depict screenshots of other exemplary embodiments of a universal input field, consistent with embodiments of the present disclosure.

Consistent with method 400, FIG. 19 depicts an exemplary embodiment of universal input field 501 where, when a user has selected "Status Update" from a drop-down list 503 of available communications channels, the input field may be modified to include a plurality of toggle icons 537, each of which represents a social network that the user can toggle on or off to selectively send the desired social networking update to selected social networks.

Figure 20:
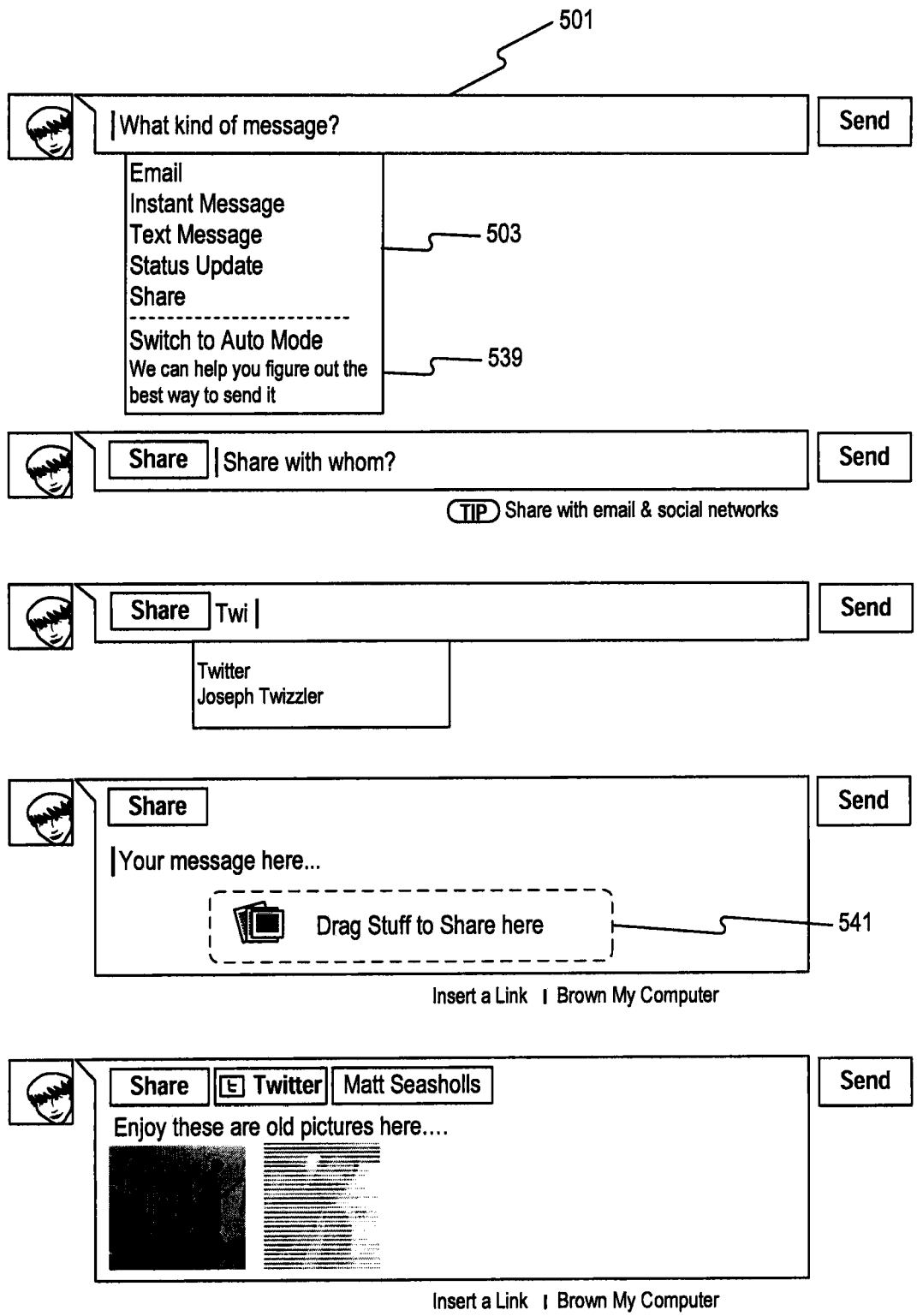

FIG. 20 depicts another exemplary universal input field 501 where drop-down menu 503 of available communications channels includes an option for "Sharing" multimedia with one or more intended recipients. Universal input field 501 may prompt the user to select intended recipients of the multimedia, with the recipients potentially including individuals, social networks, and/or multimedia sharing accounts. Universal input field 501 may expand to include a section 541, into which a user may drag any type of electronic content, multimedia, or other electronic files for sharing to the selected recipients over electronic network 101. If a selected communication channel does not support the transfer of a file, the system may automatically upload the file to a central server in lieu of transferring it, and instead simply include a textual link (e.g., a URL), by which the recipient can access and download the file using another communication channel that supports file transfer.

FIGS. 21-26 depict embodiments for an exemplary "auto-mode" of operating a universal input field. As described above, an "auto-mode" may be displayed in a drop-down menu of available communication channels, even though it is not itself a specific channel. Rather, auto-mode may automatically select a communications channel for the user, based on or more selected criteria, history, or other parameters. For example, based on input provided through the universal input field, back-end systems 108 may automatically predict the best method to use for messaging one of the user's contacts. In one embodiment, back-end systems 108 may take into account available contact information, communication history, current availability, and/or current social norms with respect to various types of communications, when determining how to message someone. For example, if two people always email each other, the system may set the default communication medium as emailing. If those two people switch to SMS text message on certain days of the week, then the system may switch to text message on those days. Accordingly, the automatic mode may simplify a user's interaction with the web portal by determining for the user how the user should best message various contacts.

Figure 21:
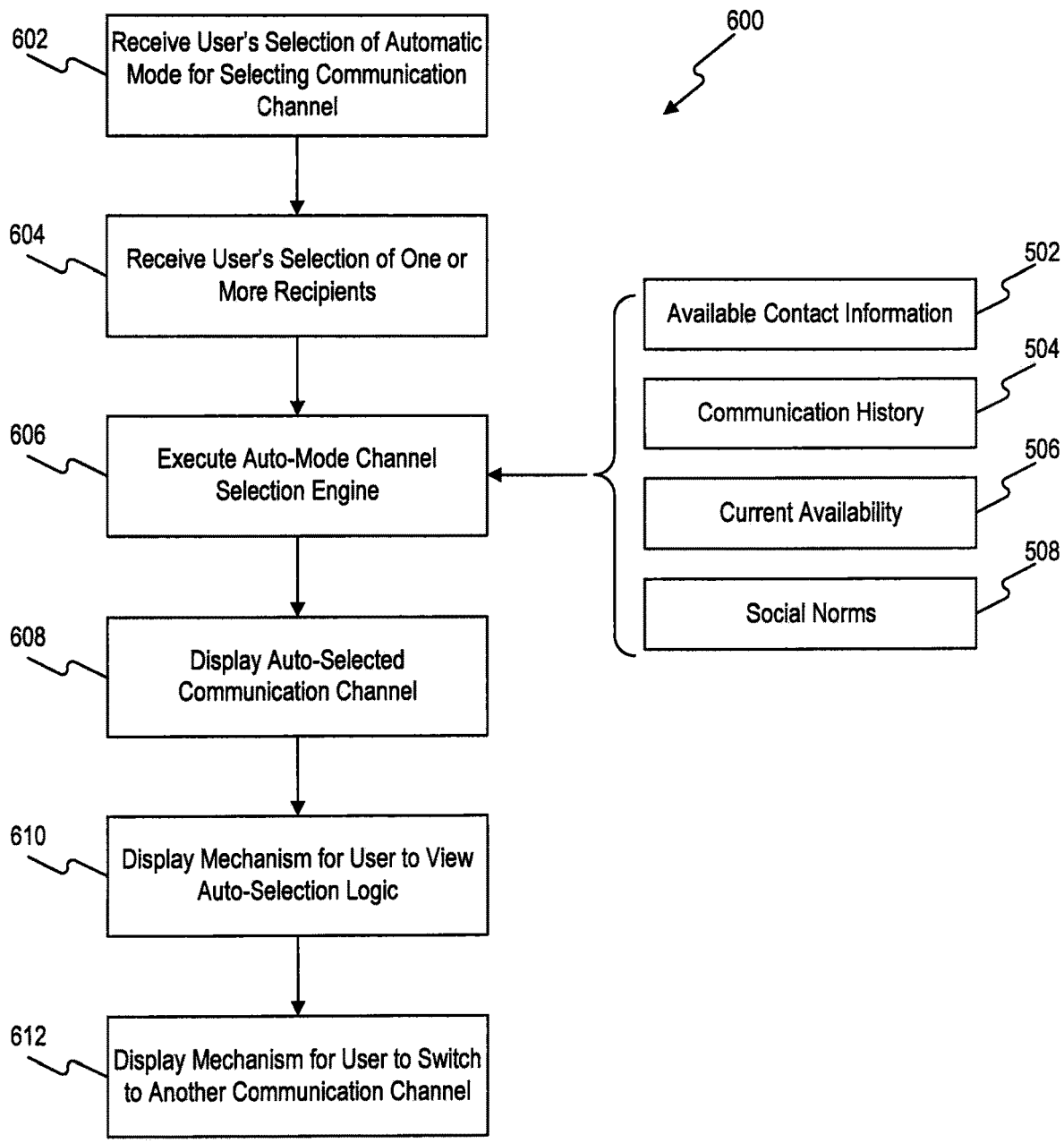
FIG. 21 depicts a flow diagram of an exemplary method for operating an "auto-mode" of a universal input field, consistent with embodiments of the present disclosure.

FIG. 21 depicts a flow diagram of an exemplary method 600 for implementing an auto-mode for selecting between available communications channels, using a universal input field. Method 600 may include receiving a user's selection of the automatic mode for selecting a communications channel (Step 602). Method 600 may further include receiving a user's selection of one or more recipients (Step 604).

Method 600 may further include executing an auto-mode channel selection engine (Step 606), based on the user's selection of one or more recipients. The auto-mode channel selection engine 522 may be any set of instructions for defining how to select a communication channel based on one or more pieces of information or criteria. For example, the channel selection engine 522 could select channels solely based on the identity of the recipient, or based on a virtually limitless stream of collected data and updated heuristics. In one embodiment, the user may customize settings of the system to reflect certain preferences for particular communications media or social contacts. For example, a user could define that, "Whatever I type to Sue, I want to send by SMS" or "Whatever I send by e-mail should include my signature." In another embodiment, the system may use machine learning techniques to determine which users in the network prefer which communications. For example, a user could place the system in "smart mode" to let the system send John the communication by his preset or machine-learned favorite communication medium.

As described above, in one embodiment, the channel selection engine 522 may be programmed to incorporate as inputs: available contact information 502, communication history 504, current availability 506, and/or social norms 508. Each of the contact information 502, communication history 504, current availability 506, and/or social norms 508 may be stored in database systems 116 with respect to profiles for each user and/or user's contact. In one embodiment, the channel selection engine 522 may first exclude any communications channels for which contact info for the one or more selected recipients is not included in available contact information 502. Channel selection engine 522 may then exclude any communication channels for which the recipient is not included in current availability 506. For example, if the recipient is not online, the engine may exclude instant messaging. If the recipient's mobile device is not activated or turned on, the engine may exclude SMS text messaging, and so on. In addition, the engine may exclude certain communications channels that are inconsistent with social norms. For example, if users tend to not use SMS text messages while they are in their homes, then the engine may exclude SMS text messaging as an available communication channel if the indicated recipient is known to be in his or her home (e.g., due to presence online, accessing their home Wi-Fi network, indicating "home" in their status, etc.) Conversely, if users tend prefer SMS text messages while they are not in their homes, then the engine may include or even rank higher SMS text messaging as an available communication channel if the indicated recipient is known to be away his or her home (e.g., due to presence offline, accessing a public Wi-Fi network, indicating "away" in their status, etc.) Similarly, if users tend to prefer certain communications channels over others based on the time of day, day of week, or any other environmental factors, the engine may include, exclude, or adjust in rank any communications channels within a list of available communications channels based on available information.

After excluding or re-ranking any unavailable or unsuitable communications channels based on environmental or circumstantial factors, the engine may rank the remaining communications channels by past usage stored in communication history 504. For example, if the user's past usage with the selected recipient indicates mostly one type of channel, then that channel will be ranked higher. If the user's past usage with the selected recipient indicates that they mostly avoided using a particular channel, then that channel will be ranked lower, and so on. Of course, it will be appreciated by those of skill in the art that almost any suitable ranking algorithm may be used to prune and rank available communications channels based on any desired parameters or information. In addition, parameters may be selectively weighted by importance. For example, if past communication history 504 is considered more important than social norms 508 (such as time-of-day), then the history may be weighted higher to factor more heavily into the communications channel that is ultimately selected by the engine.

After execution of the auto-mode channel selection engine 522 (Step 606), method 600 may further include displaying the auto-selected communication channel (Step 608). Method 600 may further include displaying a mechanism by which a user can view the auto-selection logic (Step 610). For example, the user may be presented with at least one piece of information about why a particular communications channel was selected over the others. Method 600 may further include displaying a mechanism by which a user can switch to another communications channel, besides the one auto-selected by the channel selection mechanism (Step 612).

Figure 22:
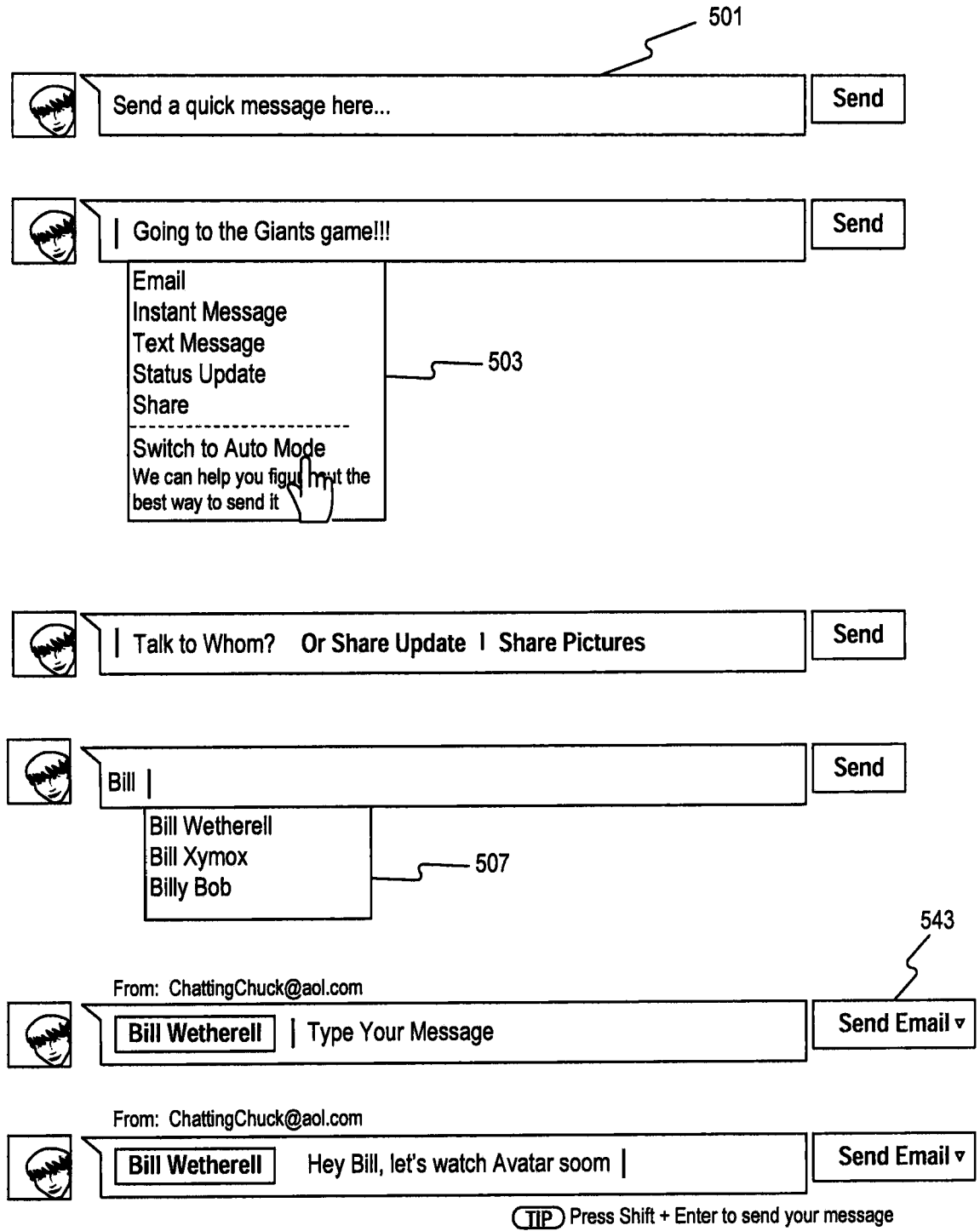
FIGS. 22-26 depict screenshots of exemplary universal input fields operating in "auto-mode," consistent with embodiments of the present disclosure.

FIG. 22 depicts exemplary screenshots and process flows for another exemplary embodiment of universal input field 501, including the steps of method 600. As shown in FIG. 22, a user may manipulate universal input field 501 so as to view a drop-down menu 503 of available communication channels, including an option to "Switch to Auto Mode." Upon selection of "Auto Mode," the universal input field 501 may display the prompts: "Talk to Whom? Or Status Update I Share Pictures." As described before, the user may simply type the first few letters of a potential recipient's name, and select one or more users from a drop-down menu 507 of available contact persons. Upon selecting one or more recipients, the universal input field 501 and back-end system 108 may execute the channel selection engine 522 of method 600 to determine which communications channel to use for the selected recipients. Assuming the channel selection engine has selected email as the preferred communications channel, back-end system 108 may modify universal input field 501 to display the user's "From:" address (in this case: "ChattingChuck@aol.com"), and to change the "Send" button to become a, "Send Email" button 543.

Figure 23A:
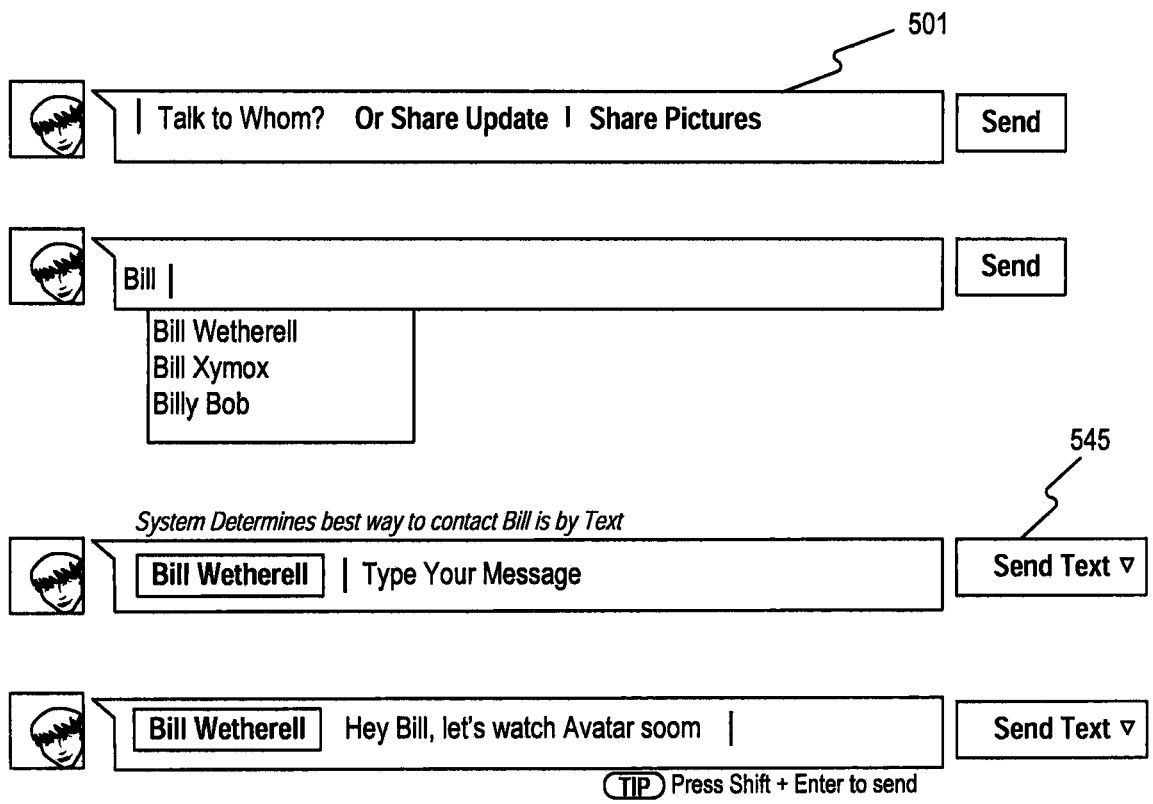

FIG. 23A depicts another exemplary screenshot of universal input field 501 in which back-end system 108 has determined that "Text" is the best way to contact the identified recipient (in this case, "Bill Wetherell"), and back-end system 108 has modified the universal input field 501 to change the "Send" button to become a, "Send Text" button 545.

Figure 23B:
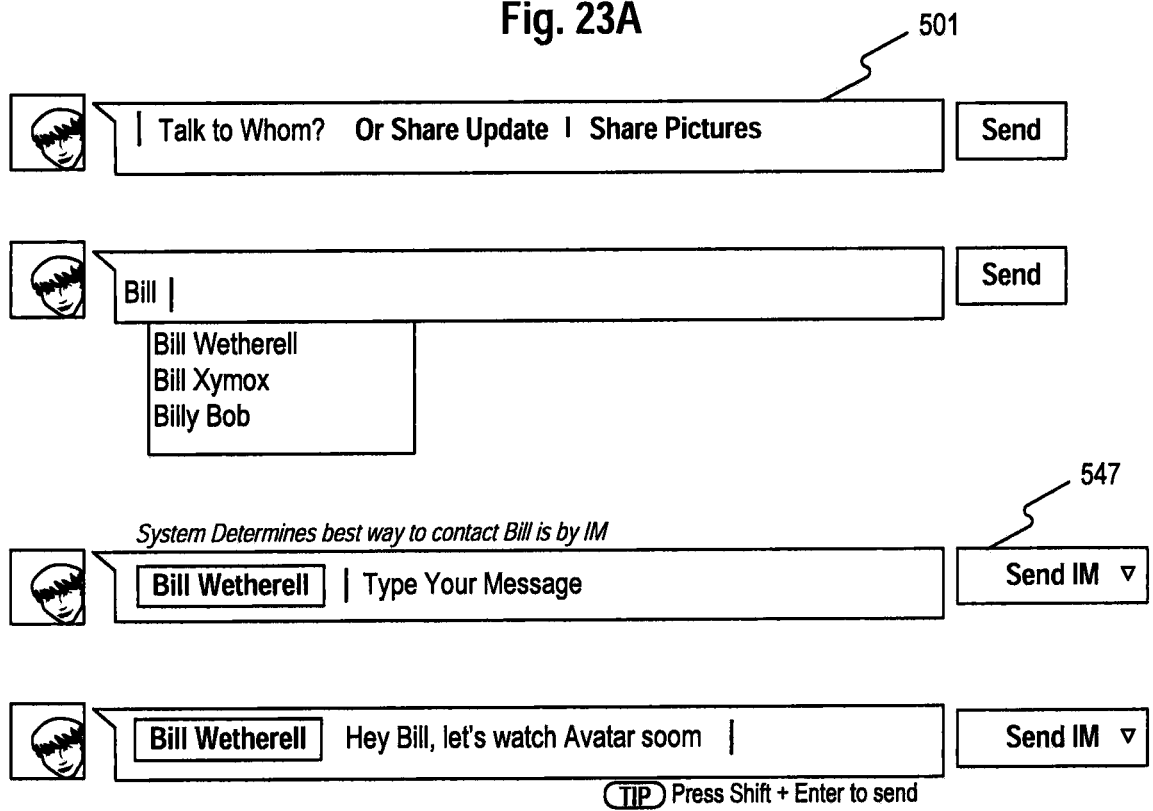

FIG. 23B depicts another exemplary screenshot of universal input field 501 in which back-end system 108 has determined that "IM" is the best way to contact the identified recipient (in this case, "Bill Wetherell"), and back-end system 108 has modified the universal input field 501 to change the "Send" button to become a, "Send IM" button 547.

Figure 24A:
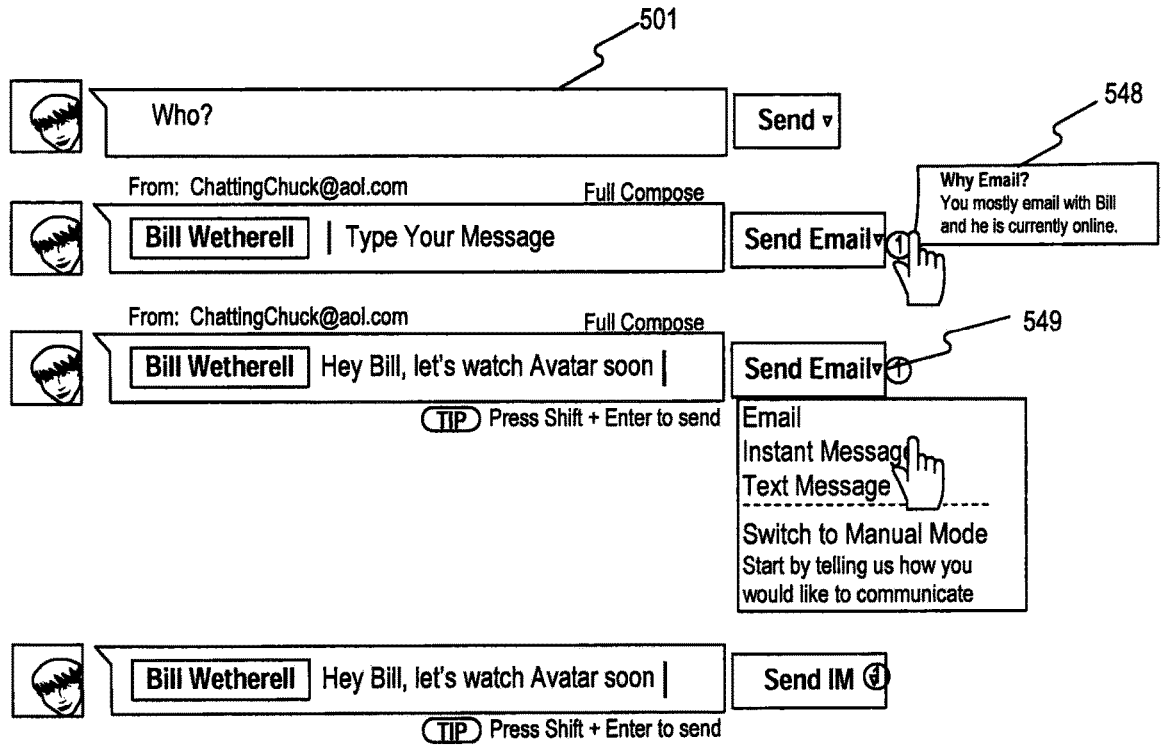

FIG. 24A depicts another screenshot of an exemplary universal input field 501, where back-end system 108 modifies the displayed input field to include notification 548 of why the back-end system 108 selected the communications channel that it did, consistent with step 610 of method 600.

Figure 24B:
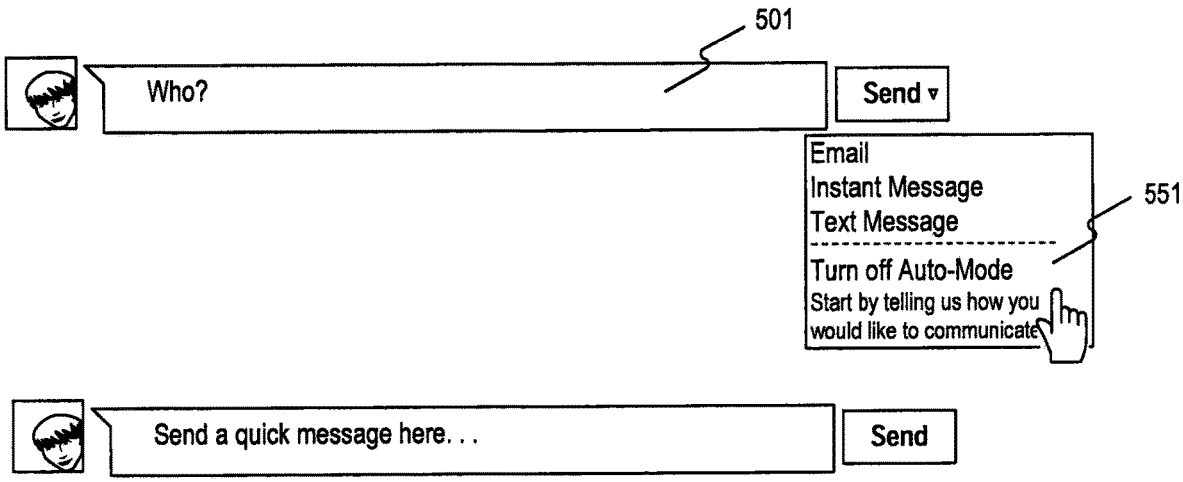

FIG. 24B depicts another screenshot of an exemplary universal input field 501, in which a user may select an option to "Turn off Auto-Mode" using drop-down button 551, the selection of which reverts the operation of universal input field 501 to the manual mode described with reference to FIGS. 2-20.

Figure 25:
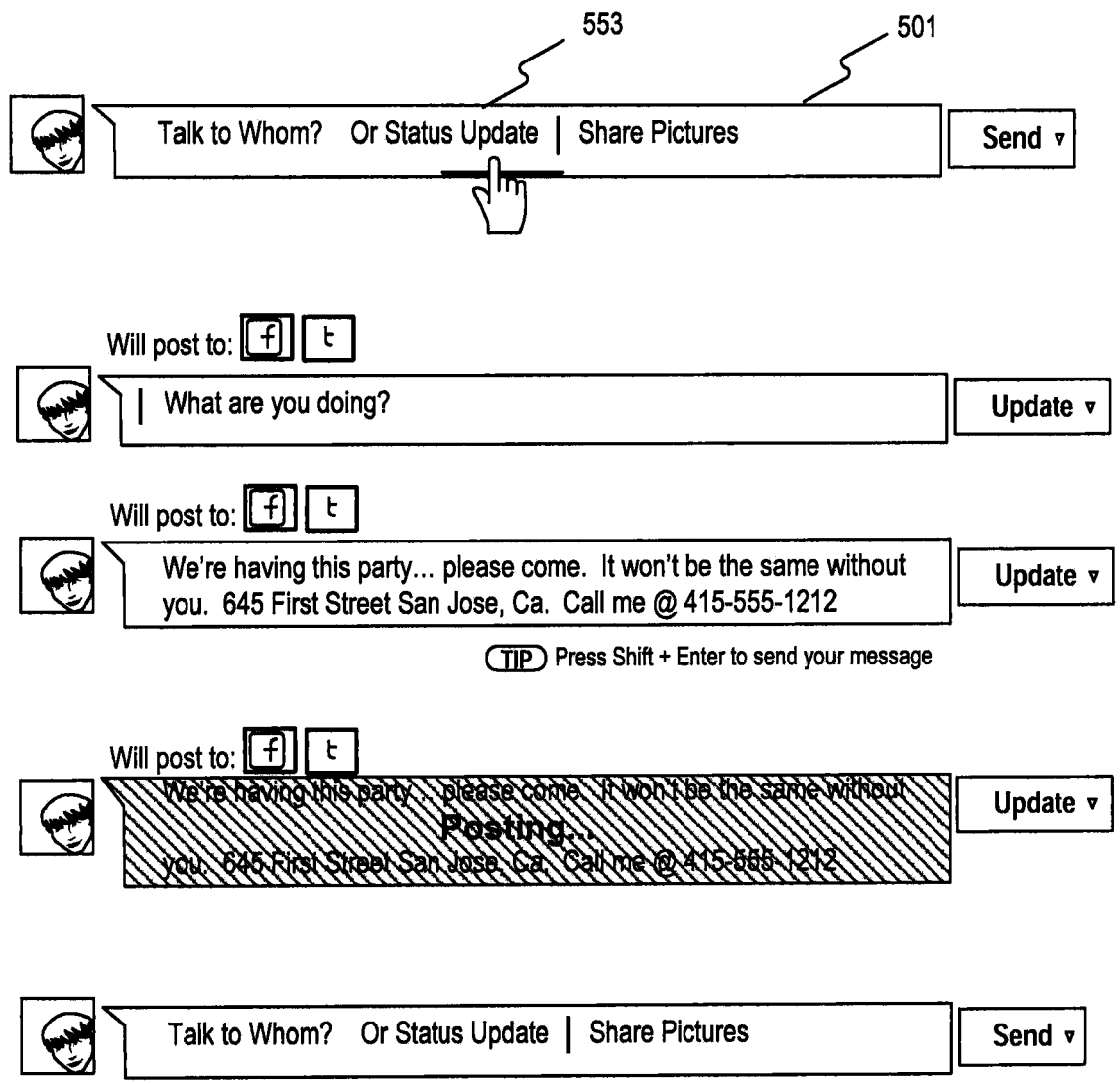

FIG. 25 depicts another screenshot of an exemplary universal input field 501, in which, while the back-end system 108 is still in auto-mode, the user may select "Status Update" icon 553, to post a status update, as already described with reference to FIGS. 17A and 19, instead of allowing the system to automatically select a communication channel for a given recipient.

Figure 26:
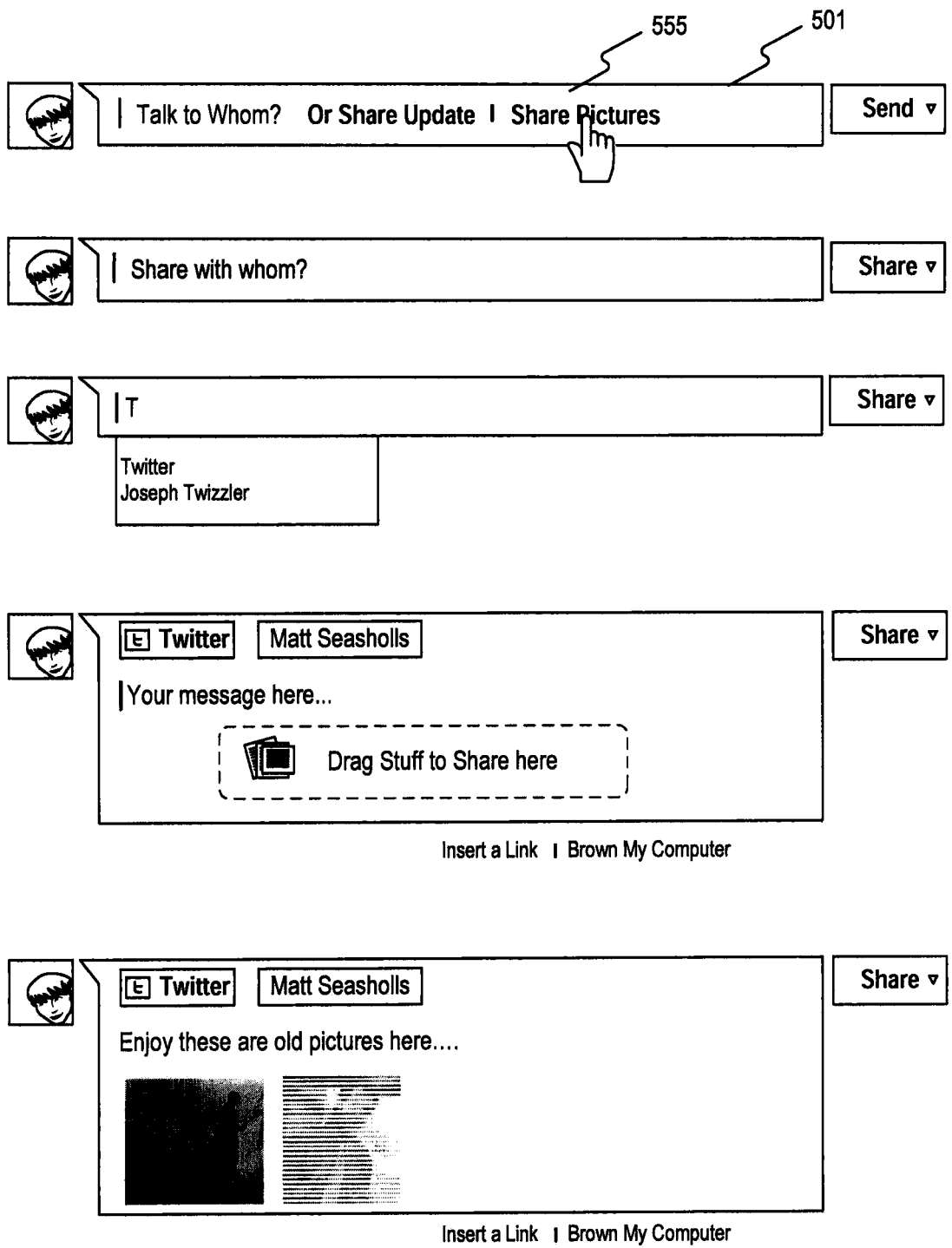

FIG. 26 depicts another screenshot of an exemplary universal input field 501, in which, while the back-end system 108 is still in auto-mode, the user may select "Share Pictures" icon 555, to share multimedia or other files, as already described with reference to FIG. 20, instead of allowing the system to automatically select a communication channel for a given recipient.

It will be appreciated that any suitable configuration of processors and data storage devices may be selected to carry out the embodiments of multi-channel messaging system 103, including back-end systems 108. The hardware associated with multi-channel messaging system 103, including back-end systems 108, may be selected to enable quick response to various business needs, relatively fast prototyping, and delivery of high-quality solutions and results. An emphasis may be placed on achieving high performance through scaling on a distributed architecture. The selected hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

Embodiments of the present disclosure may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

The many features and advantages of the present disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system for electronically transmitting messages over communication channels, the system comprising:
    at least one database storing instructions; and
    one or more processors configured to execute the instructions to perform operations including:
        displaying, over a network, a universal input field configured to accept messages for transmission over a plurality of different communication channels;
        receiving, from a user device, over the network, in response to a user interacting with the universal input field, a message, an indication to use an auto-mode channel selection, and an identification of one or more recipients;
        determining, for each of the identified one or more recipients, a unique identifier associated with the respective recipient for each of the plurality of different communication channels;
        excluding a particular communication channel, of the plurality of different communication channels, upon determining that there is no unique identifier associated with a respective recipient, of the identified one or more recipients, for the particular communication channel, to determine a plurality of remaining communication channels that does not include the particular communication channel;
        ranking the plurality of remaining communication channels, based on historical behavior data and current behavior data of each of the identified one or more recipients, the historical behavior data including past usage information associated with one or more past communication channels previously used between each of the identified one or more recipients and the user;
        based on receiving the indication to use the auto-mode channel selection, automatically selecting one of the ranked plurality of remaining communication channels for each of the identified one or more recipients based on using machine learning to identify the historical behavior data and one or more communication preferences of the identified one or more recipients;
        modifying the displayed universal input field to display the automatically selected communication channel for each of the identified one or more recipients for a limited time, the display including a preview of one or more quick responses to the message; and
        using the unique identifier associated with the respective recipient for the selected communication channel to electronically transmit display the message to each of the identified one or more recipients via the communication channel automatically selected for the respective recipient and display a reason for selecting the communication channel to the user.

2. The system of claim 1, wherein the plurality of different communication channels includes at least one of: e-mail messaging, SMS text messaging, instant messaging, or social network messaging.

3. The system of claim 1, wherein the one or more processors are configured to perform further operations including:
    determining whether each of the identified one or more recipients is available via the plurality of different communication channels based on the determined unique identifier of each identified one or more recipients for the plurality of different communication channels.

4. The system of claim 1, wherein, if the selected one or more communication channels include SMS text messaging and the message exceeds a length permitted for SMS text messaging, the one or more processors are configured to perform further operations including:
    separating the message into a plurality of SMS text messages; and
    displaying, to the user, a number of SMS text messages that will be sent to transmit the message.

5. The system of claim 1, wherein the historical behavior data is weighted based on time-of-day.

6. The system of claim 1, wherein excluding a particular communication channel is based on customized settings set by the user or a respective recipient of the message.

7. The system of claim 1, further comprising:
    detecting the user or recipient has changed the communication channel automatically selected; and
    automatically selecting a different communication channel based on the detected change.

8. A computer-implemented method for electronically transmitting messages over communication channels, the method comprising:
    displaying, over a network, a universal input field configured to accept messages for transmission over a plurality of different communication channels;
    receiving, from a user device, over the network, in response to a user interacting with the universal input field, a message, an indication to use an auto-mode channel selection, and an identification of one or more recipients;

determining, for each of the identified one or more recipients, a unique identifier associated with the respective recipient for each of the plurality of different communication channels;

excluding a particular communication channel, of the plurality of different communication channels, upon determining that there is no unique identifier associated with a respective recipient, of the identified one or more recipients, for the particular communication channel, to determine a plurality of remaining communication channels that does not include the particular communication channel;

ranking the plurality of remaining communication channels, based on historical behavior data and current behavior data of each of the identified one or more recipients, the historical behavior data including past usage information associated with one or more past communication channels previously used between each of the identified one or more recipients and the user;

based on receiving the indication to use the auto-mode channel selection, automatically selecting one of the ranked plurality of remaining communication channels for each of the identified one or more recipients based on using machine learning to identify the historical behavior data and one or more communication preferences of the identified one or more recipients;

modifying the displayed universal input field to display the automatically selected communication channel for each of the identified one or more recipients for a limited time, the display including a preview of one or more quick responses to the message; and using the unique identifier associated with the respective recipient for the selected communication channel to electronically display the message to each of the one or more recipients via the communication channel automatically selected for the respective recipient and display a reason for selecting the communication channel to the user.

9. The computer-implemented method of claim 8, wherein the plurality of different communication channels includes at least one of: e-mail messaging, SMS text messaging, instant messaging, or social network messaging.

10. The computer-implemented method of claim 8, further comprising:
determining whether each of the identified one or more recipients is available via the plurality of different communication channels based on the determined unique identifier of each identified one or more recipients for the plurality of different communication channels.

11. The computer-implemented method of claim 8, wherein, if the selected one or more communication channels include SMS text messaging and the message exceeds a length permitted for SMS text messaging, the method further comprises:
separating the message into a plurality of SMS text messages; and
displaying, to the user, a number of SMS text messages that will be sent to transmit the message.

12. The computer-implemented method of claim 8, wherein the historical behavior data is weighted based on time-of-day.

13. The computer-implemented method of claim 8, wherein excluding a particular communication channel is based on customized settings set by the user.

14. The computer-implemented method of claim 8, further comprising:
detecting the user or recipient has changed the communication channel automatically selected; and
automatically selecting a different communication channel based on the detected change.

15. A non-transitory computer readable medium for electronically distributing messages over communication channels and storing instructions to execute operations including:
displaying, over a network, a universal input field configured to accept messages for transmission over a plurality of different communication channels;
receiving, from a user device, over the network, in response to a user interacting with the universal input field, a message, an indication to use an auto-mode channel selection, and an identification of one or more recipients;
determining, for each of the identified one or more recipients, a unique identifier associated with the respective recipient for each of the plurality of different communication channels;
excluding a particular communication channel, of the plurality of different communication channels, upon determining that there is no unique identifier associated with a respective recipient, of the identified one or more recipients, for the particular communication channel, to determine a plurality of remaining communication channels that does not include the particular communication channel;
ranking the plurality of remaining communication channels, based on historical behavior data and current behavior data of each of the identified one or more recipients, the historical behavior data including past usage information associated with one or more past communication channels previously used between each of the identified one or more recipients and the user;
based on receiving the indication to use the auto-mode channel selection, automatically selecting one of the ranked plurality of remaining communication channels for each of the identified one or more recipients based on using machine learning to identify the historical behavior data and one or more communication preferences of the identified one or more recipients;
modifying the displayed universal input field to display the automatically selected communication channel for each of the identified one or more recipients for a limited time, the display including a preview of one or more quick responses to the message; and
using the unique identifier associated with the respective recipient for the selected communication channel to electronically display the message to each of the identified one or more recipients via the communication channel automatically selected for the respective recipient and display a reason for selecting the communication channel to the user.

16. The non-transitory computer readable medium of claim 15, wherein the plurality of different communication channels includes at least one of: e-mail messaging, SMS text messaging, instant messaging, or social network messaging.

17. The non-transitory computer readable medium of claim 15, wherein the operations further include:
determining whether each of the identified one or more recipients is available via the plurality of different communication channels based on the determined unique identifier of each identified one or more recipients for the plurality of different communication channels.

18. The non-transitory computer readable medium of claim 15, wherein, if the selected one or more communication channels include SMS text messaging and the message exceeds a length permitted for SMS text messaging, the operations further include:
   separating the message into a plurality of SMS text messages; and
   displaying, to the user, a number of SMS text messages that will be sent to transmit the message.

19. The non-transitory computer readable medium of claim 15, wherein the historical behavior data is weighted based on time-of-day.

20. The non-transitory computer readable medium of claim 15, wherein excluding a particular communication channel is based on customized settings set by the user.

* * * * *